United States Patent
Yang et al.

(10) Patent No.: US 10,262,597 B2
(45) Date of Patent: Apr. 16, 2019

(54) PIXEL CIRCUIT AND DRIVING METHOD THEREOF, ARRAY SUBSTRATE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Weijie Zhao, Beijing (CN); Yingming Liu, Beijing (CN); Wei Li, Beijing (CN); Chunlei Wang, Beijing (CN); Yang You, Beijing (CN); Gang Zhang, Beijing (CN); Xiaoyan Zhao, Beijing (CN); Jing Xue, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 176 days.

(21) Appl. No.: 15/119,619

(22) PCT Filed: Dec. 18, 2015

(86) PCT No.: PCT/CN2015/097879
§ 371 (c)(1),
(2) Date: Aug. 17, 2016

(87) PCT Pub. No.: WO2016/177001
PCT Pub. Date: Nov. 10, 2016

(65) Prior Publication Data
US 2017/0162121 A1 Jun. 8, 2017

(30) Foreign Application Priority Data
May 4, 2015 (CN) .......................... 2015 1 0221341

(51) Int. Cl.
*G09G 3/3266* (2016.01)
*G06F 3/00* (2006.01)
(Continued)

(52) U.S. Cl.
CPC .......... *G09G 3/3266* (2013.01); *G06F 3/007* (2013.01); *G06F 3/01* (2013.01); *G06F 3/016* (2013.01);
(Continued)

(58) Field of Classification Search
CPC ... G06F 3/0412; G06F 3/0416; G09G 3/3233; G09G 3/3258; G09G 2310/0248; G09G 2310/0251
See application file for complete search history.

(56) References Cited

U.S. PATENT DOCUMENTS 8,289,298 B2 10/2012 Choi et al.
8,451,251 B2 5/2013 Choi et al.
(Continued)

FOREIGN PATENT DOCUMENTS

CA 104282265 A 1/2015
CN 103135846 A 6/2013
(Continued)

OTHER PUBLICATIONS

Chinese Office Action in Chinese Application No. 201510221341.6, dated Oct. 24, 2016 with English translation.
(Continued)

*Primary Examiner* — Gerald Johnson
(74) *Attorney, Agent, or Firm* — Collard & Roe, P.C.

(57) ABSTRACT

A pixel circuit and a driving method thereof, an array substrate including the pixel circuit and a display apparatus
(Continued)

thereof are provided. The pixel circuit comprising a display driving sub-circuit (200) and a touch detection sub-circuit (210), wherein the display driving sub-circuit (200) is configured to drive a display element to emit light under controls of the first scan line (SCAN1), the second scan line (SCAN2), the third scan line (SCAN3), the data line (DATA) and the light emitting control line (EM); and the touch detection sub-circuit (210) is configured to detect a touch action and generate a sense signal under controls of the second scan line (SCAN2), the third scan line (SCAN3) and the data line (DATA). The effect due to variances in a threshold voltages of driving thin film transistors can be eliminated by compensation, and an integration of a touch function and an AMOLED is achieved.

20 Claims, 15 Drawing Sheets

(51) Int. Cl.

| | | |
|---|---|---|
| *G06F 3/01* | (2006.01) | |
| *G06F 3/041* | (2006.01) | |
| *H01L 27/32* | (2006.01) | |
| *G09G 3/3233* | (2016.01) | |

(52) U.S. Cl.
CPC ......... *G06F 3/0412* (2013.01); *G09G 3/3233* (2013.01); *H01L 27/3234* (2013.01); *G09G 2300/0861* (2013.01); *G09G 2310/0251* (2013.01); *G09G 2310/0262* (2013.01); *G09G 2320/043* (2013.01); *G09G 2354/00* (2013.01)

(56) References Cited

U.S. PATENT DOCUMENTS

| | | | |
|---|---|---|---|
| 9,122,339 B2 | 9/2015 | Yang | |
| 9,318,540 B2 | 4/2016 | Qing et al. | |
| 2011/0273397 A1* | 11/2011 | Hanari | G06F 3/0412 |
| | | | 345/174 |
| 2012/0044176 A1 | 2/2012 | Nakamura et al. | |
| 2014/0168127 A1* | 6/2014 | Yang | G06F 3/0412 |
| | | | 345/173 |
| 2014/0313138 A1* | 10/2014 | Jeong | G09G 3/3258 |
| | | | 345/173 |
| 2016/0266688 A1 | 9/2016 | Yang et al. | |

FOREIGN PATENT DOCUMENTS

| | | |
|---|---|---|
| CN | 103236238 A | 8/2013 |
| CN | 103310729 A | 9/2013 |
| CN | 103996377 A | 8/2014 |
| CN | 104021756 A | 9/2014 |
| CN | 203825988 U | 9/2014 |
| CN | 203858846 U | 10/2014 |
| CN | 104835449 A | 8/2015 |
| KR | 10-2011-0003187 A | 1/2011 |

OTHER PUBLICATIONS

International Search Report of PCT/CN2015/097879 in Chinese, dated Mar. 18, 2016 with English translation.
Notice of Transmittal of the International Search Report of PCT/CN2015/097879 in Chinese, dated Mar. 18, 2016.
Written Opinion of the International Searching Authority of PCT/CN2015/097879 in Chinese, dated Mar. 18, 2016 with English translation.

* cited by examiner

PIXEL CIRCUIT AND DRIVING METHOD THEREOF, ARRAY SUBSTRATE AND DISPLAY APPARATUS

CROSS REFERENCE TO RELATED APPLICATIONS

This application is the National Stage of PCT/CN2015/097879 filed on Dec. 18, 2015, which claims priority under 35 U.S.C. § 119 of Chinese Application No. 201510221341.6 filed on May 4, 2015, the disclosure of which is incorporated by reference.

TECHNICAL FIELD

The present disclosure relates to a field of display technique, and particularly to a pixel circuit and a driving method thereof, an array substrate including the pixel circuit and a display apparatus thereof.

BACKGROUND

With the rapid development of display technology, touch screen (Touch Screen Panel) has become popular gradually in life. Currently, the touch screen can be divided into an Add-on-Mode Touch Panel and an In-Cell Touch Panel according to the structure thereof. Among them, the Add-on-Mode Touch Panel is formed by producing a touch screen and a display screen separately and then bonding them together so as to produce a touch panel with a touch function. The Add-on-Mode Touch Panel has the disadvantages such as high production cost, low light transmittance, thicker modules and the like, while the In-Cell Touch Panel has touch electrodes of a touch screen embedded inside a display screen, which decreases the overall thickness of the modules, and significantly reduces the production cost of the touch panel, and gains the favor of the manufacturer of the touch panel.

Meanwhile, as compared with the existing liquid crystal display screen, the display screen with the organic light emitting diodes (OLEDs) is a hot topic of the flat panel display research area, which has the advantages such as a low power, low cost, self-luminous, wide viewing angle and fast response, etc., and is easy to implement color display and a large screen display, suitable to match the IC drivers, and can operate in a wide temperature range. Further, the OLED display has a small volume and light weight, and is easy to implement a flexible display, thus having a broad application prospect. According to different driving modes, OLED can be divided into a passive matrix organic light emitting display (PMOLED) and an active matrix organic light emitting display (AMOLED). Although the PMOLED has the advantages such as a simple producing process and low cost, it has the disadvantages such as crosstalk, high power consumption, low lifespan and the like, thus can not meet the requirement of the large-size high-resolution display. In contrast, AMOLED with TFTs integrated into the panel has advantages such as low driving current as required, low power consumption, long service life, and can meet the requirements of the large size display, such as high-resolution and multiple gray scales.

Different from the Thin film transistor liquid crystal display (TFT-LCD) using a voltage to control the brightness of light-emitting transistors, it is required for OLED to use a stable current to control the brightness of LEDs since the OLED is of the current-driving type. However, due to process technology and the aging of device and other reasons, in the existing 2T1C driving circuit, there is non-uniformity among the threshold voltages of the driving thin film transistors (DTFT) of respective pixels for driving the light emitting diodes, which resulting in variance in the currents flowing through the respective OLEDs even if an identical driving voltage is applied to the gates of the respective driving thin film transistors, thus affecting the display.

SUMMARY

In view of the above-mentioned problems, inventors propose a pixel circuit and a driving method thereof, an array substrate including the pixel circuit and a display apparatus thereof, wherein an effect due to variances in a threshold voltage (Vth) of a driving thin film transistor (TFT) can be eliminated by means of compensations, so that emitting of an OLED can not be affected by the threshold voltage of the driving TFT, which can ensure that no driving current flows through the OLED except during a light-emitting phase, and in turn a lifespan of the OLED can be increased.

Meanwhile, the inventors propose incorporating a touch detection sub-circuit capable of detecting a touch action in the pixel circuit, for example, a touch detection sub-circuit utilizing a capacitance touch detection principle or a photosensitive touch detection principle, therefore a combination of the in cell touch function and the AMOLED is realized.

According to an aspect of the present disclosure, there is provided a pixel circuit comprising a display driving sub-circuit and a touch detection sub-circuit, wherein the display driving sub-circuit is connected with a data line, a light emitting control line and a plurality of scan lines, and is configured to drive a display element to emit light under controls of the data line, the light emitting control line and the plurality of scan lines; and the touch detection sub-circuit is connected with the data line and some of the plurality of scan lines, and is configured to detect a touch action and generate a sense signal under controls of the data line and the some of the plurality of scan lines.

Optionally, the display driving sub-circuit comprises: a display driving reset unit, connected with the first scan line and a first node and configured to reset the first node under an control of the first scan line; a driving transistor having a control terminal connected with the first node, configured to drive the display element to emit light according to a level at the first node; a light emitting control unit, connected with a light emitting control line, and a first terminal and a second terminal of the driving transistor, and configured to control the driving transistor so as to drive the display element to emit light according to a signal input from the light emitting control line; a compensation unit, connected with the first node, the driving transistor and the light emitting control unit and configured to compensate for a threshold voltage of the driving transistor under a control of the second scan lines; and a display signal input unit, connected with the data line, the third scan line and the compensation unit and configured to input a digital signal provided from the data line into the compensation unit under a control of the third scan line.

Optionally, the display driving reset unit comprises a display driving reset transistor having a control terminal connected with the first scan line, a first terminal connected with a first power supply line and a second terminal connected with the first node.

Optionally, the light emitting control unit comprises a first light emitting control transistor having a control terminal connected with a first light emitting control transistor, a control terminal connected with the light emitting control line, a first terminal connected with a second power supply line, a second terminal connected with a first terminal of the driving transistor; and a second light emitting control transistor having a control terminal connected with the light emitting control line, a first terminal connected with a second terminal of the driving transistor, and a second terminal connected with the display element.

Optionally, the compensation unit comprises: a compensation transistor having a first terminal connected with the first node and a second terminal thereof as an input terminal of the compensation unit for receiving the data signal; a first compensation transistor having a control terminal is connected with the second scan line, a second terminal connected with the first node and a first terminal connected with the first terminal of the driving transistor; a second compensation transistor having a control terminal connected with the second scan line, a second terminal connected with a second terminal of the compensation transistor, and a first terminal connected with one of the first power supply line, the second power supply line and a third power supply line; and a third compensation transistor having a control terminal connected with the second scan line, a first terminal connected with the third scan line and a second terminal connected with the second terminal of the driving transistor.

Optionally, the display signal input unit comprises an input transistor having a control terminal connected with the third scan line, a first terminal is connected with the data line and a second terminal is connected with the input terminal of the compensation unit.

Optionally, the touch detection sub-circuit comprises: a pre-charging unit, connected with the data line and the second scan line, and configured to pre-charge with a level provided from the data line under the control of the second scan line; a touch sensing unit, connected with the pre-charging unit and configured to sense a touch action and generate a sense signal; and a sense signal output unit, connected with the touch sensing unit and the third scan line, and configured to output the sense signal generated by the touch sensing unit to a sense signal collection line under the control of the third scan line.

Optionally, the pre-charging unit comprises a pre-charging transistor having a control terminal is connected with the second scan line, a first terminal connected with the data line and a second terminal connected with the third node, as an output terminal of the pre-charging unit.

Optionally, the touch sensing unit is a capacitive touch unit and comprises: a storage capacitor having a first terminal connected with the third node, a second terminal connected with the third power supply line; and a sensing transistor having a control terminal connected with the third node, a first terminal connected with the third power supply line and a second terminal thereof functioning as an output terminal of the touch sensing unit.

Optionally, the sense signal output unit comprises an output transistor having a control terminal connected with the third scan line, a first terminal connected with the output terminal of the touch sensing unit, and a second terminal connected with the sense signal collection line.

Optionally, the touch sensing unit is a photosensitive touch unit and comprises: a photosensitive transistor having a control terminal and a first terminal thereof connected with the third node; and a storage capacitor having a first terminal connected with a second terminal of the photosensitive transistor, and a second terminal connected with the third node.

Optionally, the touch detection sub-circuit further comprises a touch reset unit, connected with the touch sensing unit and the first scan line, configured to reset the touch sensing unit under a control of the first scan line.

Optionally, the sense signal output unit comprises an output transistor having a control terminal connected with the third scan line, a first terminal connected with the first terminal of the storage capacitor, and the second terminal connected with the sense signal collection line.

Optionally, the touch reset unit comprises a touch reset transistor having a control terminal connected with the first scan line, a first terminal connected with the first power supply line, and a second terminal connected with the third node.

Optionally, the display element is an Organic Light Emitting Diode (OLED) having an anode connected with the second terminal of the second light emitting control transistor, and a cathode connected with the first power supply line.

Optionally, the first power supply line supplies a ground voltage GND, the second power supply line supplies a power supply voltage Vdd, and the third power supply line supplies a pulse voltage Vcom.

Optionally, the control terminal is a gate of the transistor, the first terminal is a source of the transistor, and the second terminal is a drain of the transistor.

According to another aspect of the present disclosure, there is further provided an array substrate comprising the any one of the pixel circuits described above.

According to a still aspect of the present disclosure, there is further provided a display apparatus comprising any one of the array substrates described above.

According to a further aspect, there is further provided a driving method applicable to the pixel circuit described above, comprising: driving the display element to emit light for display by the display driving sub-circuit, under the control of the data line, the light emitting control line and the plurality of scan lines; and detecting the touch action and generate the sense signal by the touch detection sub-circuit under controls of the data line and the some of the plurality of scan lines.

Optionally, driving the display element to emit light for display by the display driving sub-circuit comprises: applying a first scan signal to the first scan line to turn on the reset sub-unit so that the first node is reset; applying a second scan signal to the second scan line so as to pre-charge the compensation unit; applying a third scan signal to the third scan line to turn on the display signal input unit, so that the data voltage on the data line is input to the compensation unit; and applying a light emitting control signal to the light emitting control line to turn on the light emitting control unit so that a voltage subjected to a threshold voltage compensation is applied to the control terminal and the first terminal of the driving transistor, and the light emitting element is driven to emit light for display.

Optionally, detecting the touch action and generating the sense signal by the touch detection sub-circuit comprises: applying the second scan signal to the second scan line to turn on the pre-charging unit so that the capacitive touch unit is pre-charged with a data voltage signal supplied from the data line; sensing the touch action and generating the sense signal by the capacitive touch unit; and applying the third scan signal to the third scan line to turn on sense signal output unit, so that the sense signal generated by the capacitive touch unit is output to the sense signal collection line.

Optionally, detecting the touch action and generating the sense signal by the touch detection sub-circuit comprises: applying the first scan signal to the first scan line so as to reset the photosensitive touch unit; applying the second scan signal to the second scan line to turn on the pre-charging unit, so that the photosensitive touch unit is pre-charged with a data voltage signal supplied from the data line; sensing the touch action and generating the sense signal by the photosensitive touch unit; and applying the third scan signal to the third scan line to turn on sense signal output unit, so that the sense signal generated by the photosensitive touch unit is output to the sense signal collection line.

The pixel circuit and the driving method thereof according to the embodiments of the present disclosure can compensate for the threshold voltage of the driving TFT, eliminate an influence of un-uniformity of the threshold voltage in the respective driving TFTs on a driving current flowing through the OLED due to a manufacture process and the aging, and ensures an uniformity of the display, so that a display effect can be improved. Meanwhile, the touch detection unit is incorporated into the pixel circuit, for example, the capacitive touch detection unit or the photosensitive touch detection unit, so that an integration between the AMOLED and the In Cell touch can be realized, which increases a degree of a system integration.

BRIEF DESCRIPTION OF THE DRAWINGS

The present disclosure will become more fully understood from the detailed description given hereinafter and the accompanying drawings which are given by way of illustration only, and thus are not limitative of the present disclosure.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

Figure 1:
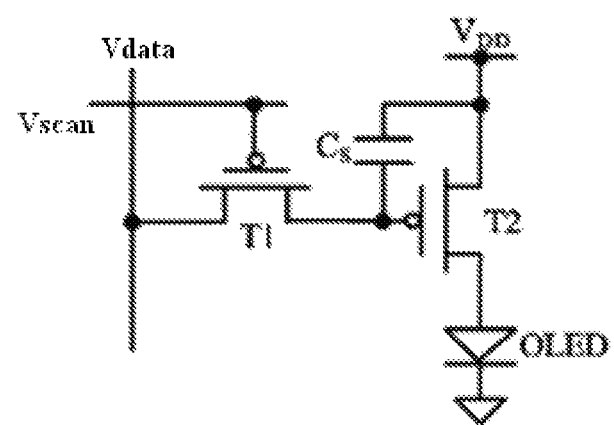
FIG. 1 exemplarily illustrates a known 2T1C pixel circuit.

As described above, a driving TFT has a threshold voltage, but there may be variations among the threshold voltages Vth of the driving TFTs in respective pixel points due to manufacture processes. Also, the threshold voltage of the driving TFT would drift after a long time operation of the driving TFT, which may cause a un-uniformity in brightness of the OLEDs of the respective pixel points and affect a uniformity of the display. For example, as illustrated in FIG. 1, a known 2T1C pixel circuit comprises a driving TFT T2, a switch TFT T1 and a storage capacitor Cs, wherein T1 and T2 are TFTs of P type; a gate of the switch TFT T1 is connected with a scan line Vscan, a source thereof is connected with a data line Vdata, a drain thereof is connected with a gate of the driving TFT T2; a source of the driving TFT T2 is connected with a power supply voltage VDD, a drain thereof is connected with an anode of an OLED; a cathode of the OLED is grounded; the storage capacitor Cs is connected between the gate and source of the driving TFT T2 in parallel. When the current pixel starts to be scanned, the scan line Vscan is at a low level, T1 is turned on, the data voltage Vdata supplied from the data line is written into the storage capacitor Cs. Then, the level of Vscan rises after the scanning is completed, and T1 is turned off. The driving TFT T2 is turned on by the data voltage stored in Cs, and thus the OLED is driven to emit light.

Herein, a driving current of the driving TFT T2, that is, an operating current of the OLED, may be represented as $I_{OLED}=K(V_{GS}-V_{th})^2$, wherein $V_{GS}$ is a gate-source voltage of the driving transistor, $V_{th}$ is a threshold voltage of the driving transistor, K is a coefficient and may be denoted as $$K = \mu \cdot C_{ox} \frac{W}{L}.$$

Herein μ is a Carrier Mobility, $C_{ox}$ is a capacitance in a gate oxide layer, and W/L is a width-to-length ratio of a channel of the driving transistor.

As described above, there may be variations among the threshold voltages $V_{th}$ of the driving TFTs in the respective pixel points due to the manufacture processes and the aging, and the threshold voltage $V_{th}$ would drift with usage, such that the generated driving current, that is, the current flowing through the OLED, may vary with the drifting of variations of $V_{th}$ even if same gate-source voltages are applied to the driving transistors, which would affect the uniformity in the display.

In view of this, the inventor(s) proposes a pixel circuit capable of compensating for the threshold voltage of the driving TFT and eliminating an influence of the threshold voltage of the driving TFT on the operating current for driving the OLED to emit light for display, therefore the effect of display is improved.

Meanwhile, the inventor(s) further proposes to incorporate a touch detection sub-circuit in the pixel circuit. Accordingly, in the pixel circuit according to an embodiment of the present disclosure, a touch detection circuit is incorporated, for example, a capacitive touch detection unit or a photosensitive touch detection unit, so that an integration of an In-Cell touch and an AMOLED is realized.

In particular, for the capacitive touch unit, for example, when a finger is close to a screen, an intervening of the finger changes a coupling capacitance of a touch sensing electrode, the changing of the coupling capacitance leads to corresponding changing of a potential, a specific position of the touch on the screen can be determined by collecting and analyzing such changes.

For the photosensitive touch unit, a photosensitive transistor is utilized to sense a variety of a light intensity on the screen so as to determine the position of the touch. For example, when a laser pen irradiates or the finger touches, the light intensity received by the photosensitive transistor changes, therefore the generated sense current changes. Particularly, if the laser pen irradiates the screen, the light intensity of the irradiated position on the screen is increased, the sense current of the photosensitive transistor increases accordingly; if the finger touches the screen, which is equal to shade the light, the light intensity decreases, and the sense current reduces accordingly.

Figure 2:
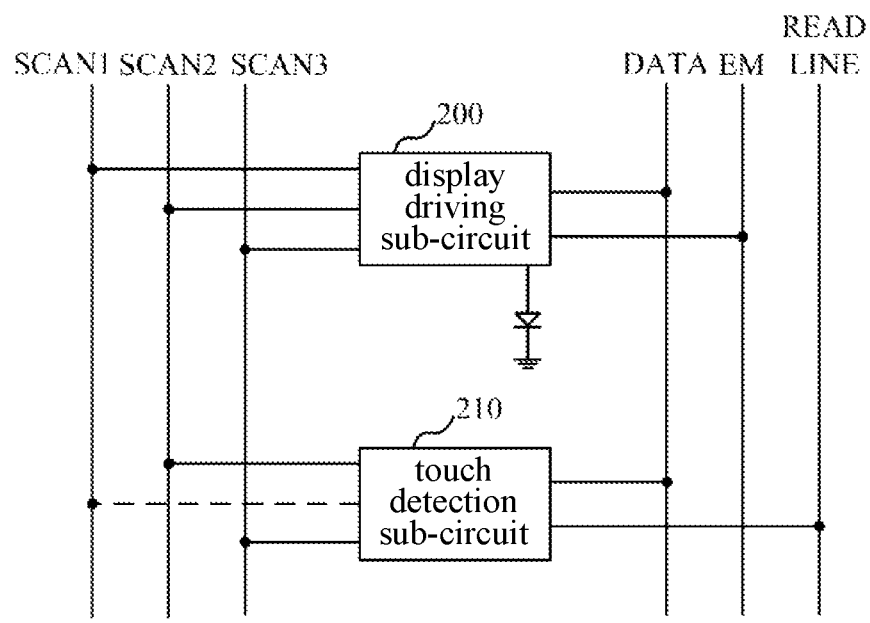
FIG. 2 exemplarily illustrates a structure block diagram of a pixel circuit according to an embodiment of the present disclosure.

FIG. 2 exemplarily illustrates a structure block diagram of a pixel circuit according to an embodiment of the present disclosure, wherein the pixel circuit comprises a display driving sub-circuit 200 and a touch detection sub-circuit 210, wherein the display driving sub-circuit 200 is connected with a plurality of scan lines (for example, a first scan line SCAN1, a second scan line SCAN2, a third scan line SCAN3), a data line DATA and a light emitting control line EM, and drives a display element to emit light under controls of the first scan line SCAN1, the second scan line SCAN2, the third scan line SCAN3, the data line DATA and the light emitting control line EM; and the touch detection sub-circuit 210 is connected with some of the plurality of scan lines (for example, the second scan line SCAN2 and the third scan line SCAN3) and the data line DATA, and detects a touch action and generate a sense signal under controls of the second scan line SCAN2, the third scan line SCAN3 and the data line DATA.

In the pixel circuit according to the above embodiment, the display driving sub-circuit and the touch detection sub-circuit share some signal lines, for example, the second scan line SCAN2, the third scan line SCAN3 and the data line DATA, so that an integration between an AMOLED pixel display and a touch detection is realized.

Figure 3A:
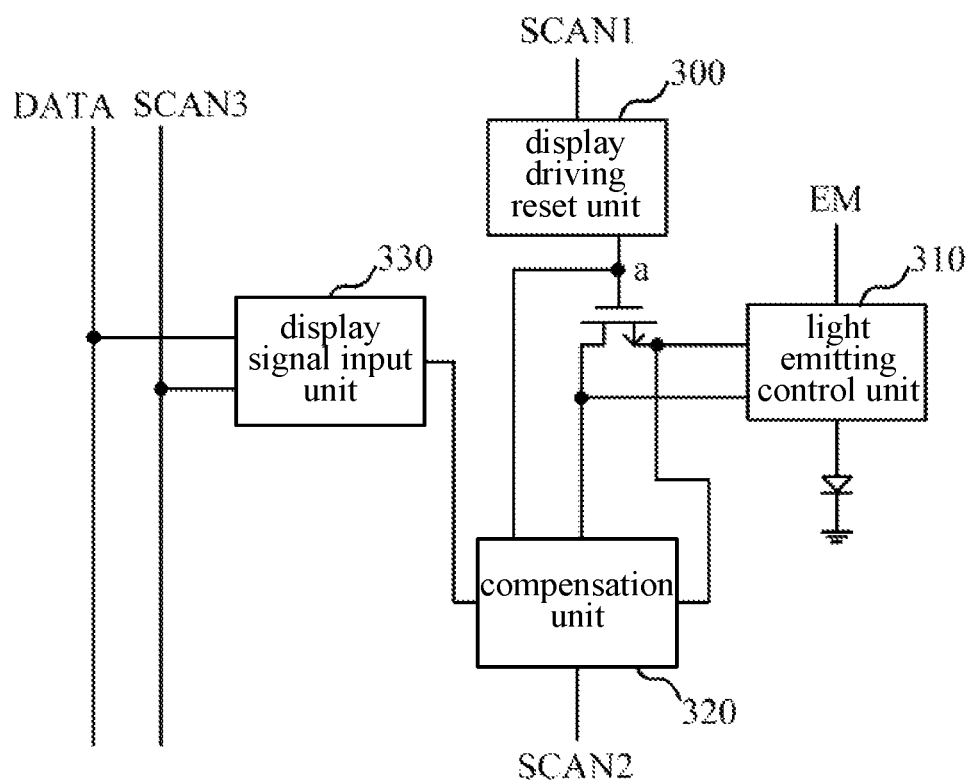
FIGS. 3A-3C exemplarily illustrate structure block diagrams of the major parts in the pixel circuit according to an embodiment of the present disclosure.

FIG. 3A illustrates a structure of the display driving sub-circuit utilized in the above pixel circuit according to an embodiment of the present disclosure, wherein the display driving sub-circuit comprises:

a display driving reset unit 300, connected with the first scan line SCAN1 and a first node a and configured to reset the first node a according to a signal input from the first scan line SCAN1;

a driving transistor DTFT, a gate connected with the first node a, configured to be turned on under the control of a level at the first node a so as to output a driving current to drive the display element to emit light for display;

a light emitting control unit 310, connected with the light emitting control line EM, a source and a drain of the driving transistor DTFT, and configured to control the driving transistor DTFT to drive the display element to emit light for display according to a signal input from the light emitting control line EM;

a compensation unit 320, connected with the first node a, the driving transistor DTFT and the light emitting control unit 310 and configured to compensate for a threshold voltage of the driving transistor DTFT under a control of a signal input from the second scan line SCAN2; and an input unit 330, connected with the data line DATA, the third scan line SCAN3 and the compensation unit 320 and configured to provide a display data signal input from the data line to the compensation unit under a control of a signal input from the third scan line SCAN3.

Figure 3B:
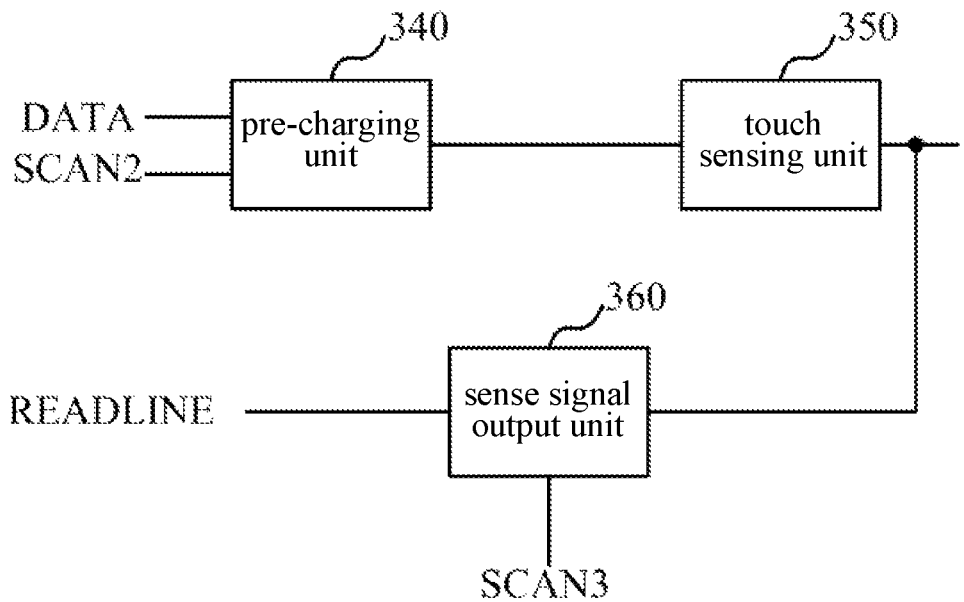

FIG. 3B illustrates a structure of the touch detection sub-circuit utilized in the above pixel circuit according to an embodiment of the present disclosure, wherein the touch detection sub-circuit comprises:

a pre-charging unit 340, connected with the data line DATA and the second scan line SCAN2, and configured to pre-charge the touch detection sub-circuit with the signal provided from the data line DATA under the control of the second scan line SCAN2;

a touch sensing unit 350, connected with the pre-charging unit 340 and configured to sense a touch action and generate a sense signal; and a sense signal output unit 360, connected with the touch sensing unit 350 and the third scan line SCAN3, and configured to output the sense signal generated by the touch sensing unit to a sense signal collection line READ LINE under the control of the third scan line SCAN3.

Figure 3C:
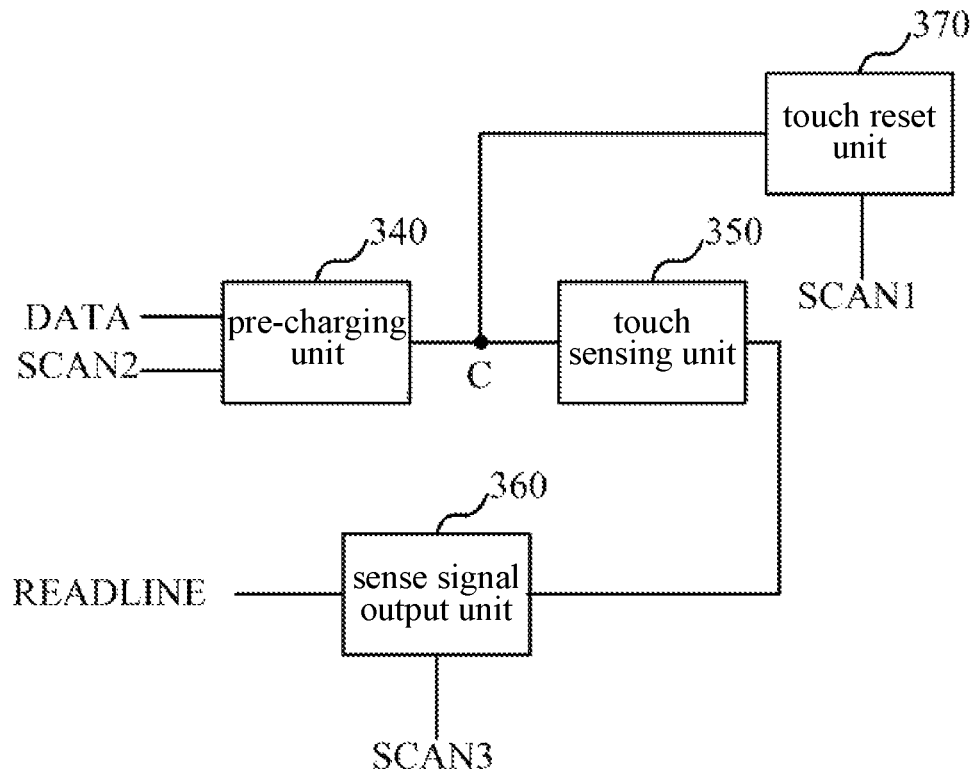

FIG. 3C illustrates a structure of another touch detection sub-circuit utilized in the above pixel circuit according to an embodiment of the present disclosure, wherein the touch detection sub-circuit comprises:

a pre-charging unit 340, connected with the data line DATA and the second scan line SCAN2, and configured to pre-charge the touch detection sub-circuit with the signal provided from the data line DATA under the control of the second scan line SCAN2;

a touch sensing unit 350, connected with the pre-charging unit 340 and configured to sense a touch action and generate a sense signal;

a sense signal output unit 360, connected with the touch sensing unit 350 and the third scan line SCAN3, and configured to output the sense signal generated by the touch sensing unit to a sense signal collection line READ LINE under the control of the third scan line SCAN3; and a touch reset unit 370, connected with the touch sensing unit 350 and the first scan line SCAN1 and configured to reset the touch sensing unit 350 under the control of the first scan line SCAN1.

In the above embodiments of the present disclosure, the compensation unit is incorporated in the display driving sub-circuit, the threshold voltage of the driving transistor DTFT can be compensated for, so that an influence of the threshold voltage of the driving transistor DTFT on the display element is eliminated and the display effect is improved.

Meanwhile, the touch detection circuit is integrated into the pixel circuit, and the display driving sub-circuit and the touch detection sub-circuit share the second scan line SCAN2, the third scan line SCAN3 and the data line DATA, so that the integration between the AMOLED pixel display and the touch detection is realized.

Figure 4:
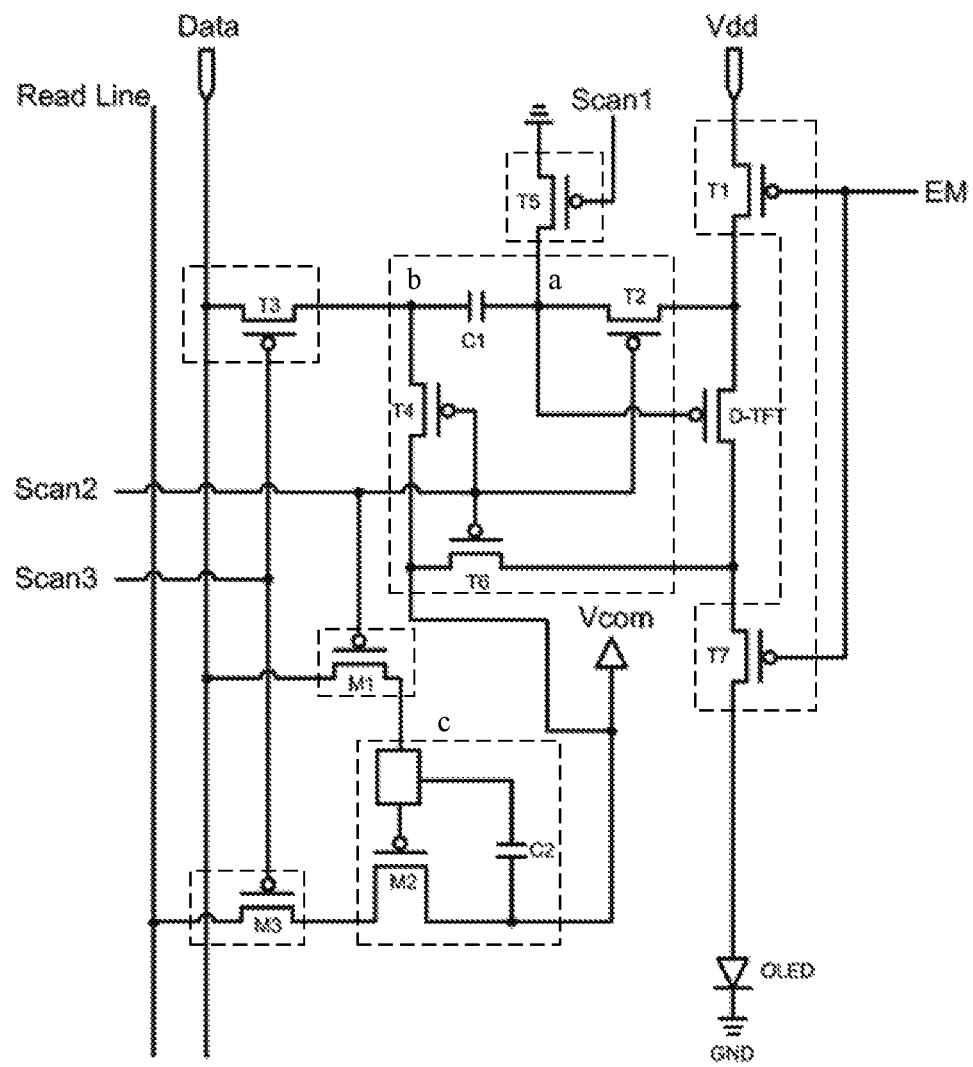
FIG. 4 exemplarily illustrates a specific structure of a pixel circuit according to an embodiment of the present disclosure.

FIG. 4 exemplarily illustrates a specific structure of a pixel circuit according to an embodiment of the present disclosure.

In particular, in the display driving sub-circuit, the display driving reset unit comprises a reset transistor T5 having a gate connected with the first scan line SCAN1, a source connected with a first power supply line GND and a drain connected with the first node a.

The light emitting control unit comprises a first light emitting control transistor T1 having a gate connected with the light emitting control line EM, a source connected with a second power supply line Vdd, a drain connected with the source of the driving transistor DTFT; and a second light emitting control transistor T7 having a gate connected with the light emitting control line EM, a source connected with the drain of the driving transistor DTFT, and a drain connected with the display element.

The compensation unit comprises: a compensation capacitor C1 having a first terminal connected with the first node a and a second terminal as an input terminal of the compensation unit for receiving the data signal Vdata; a first compensation transistor T2 having a gate connected with the second scan line SCAN2, a source connected with the source of the driving transistor DTFT, and a drain connected with the first node a; a second compensation transistor T4 having a gate connected with the second scan line SCAN2, a drain connected with the second terminal (illustrated as a second node b in drawings) of the compensation capacitor C1, a source connected with a third power supply line Vcom; and a third compensation transistor T6 having a gate connected with the second scan line SCAN2, a source connected with the third power supply line Vcom and a drain connected with the drain of the driving transistor DTFT.

The display signal input unit comprises a display data input transistor T3 having a gate connected with the third scan line SCAN3, a source connected with the data line DATA and a drain is connected with the second terminal of the compensation capacitor C1.

Further, as illustrated in FIG. 4, in the touch detection sub-circuit, the pre-charging unit comprises a pre-charging transistor M1 having a gate connected with the second scan line SCAN2, a source connected with the data line DATA, and a drain connected with a touch sensing electrode (illustrated as a third node c in drawings).

In an example, the touch sensing unit is a capacitive touch unit and comprises: a storage capacitor C2 having a first terminal connected with the touch sensing electrode, and a second terminal connected with the third power supply line Vcom; and a sensing transistor M2 having a gate connected with the touch sensing electrode, and a source connected with the third power supply line Vcom.

The sense signal output unit comprises an output transistor M3 having a gate connected with the third scan line SCAN3, a source connected with the drain of the sensing transistor M2, and a drain connected with the sense signal collection line READ LINE.

Optionally, in the above embodiments of the present disclosure, the display element is an Organic Light Emitting Diode (OLED) having an anode connected with the drain of the second light emitting control transistor T7, and a cathode connected with the first power supply line GND.

Optionally, all of the transistors in FIG. 4 are Thin Film TFTs (TFTs) of P type, therefore the manufacture process is simplified and a productive efficiency is enhanced. Of course, some or all of the transistors may also be TFTs of N type depending on requirements, as long as levels of the corresponding control signals are adjusted, and specific connection relationships would be omitted herein.

Optionally, in the present disclosure, besides the gate of the transistor, which functions as the control terminal of the transistor, one terminal of the transistor for inputting a signal is referred to as the source while the other terminal for outputting the signal is referred to as the drain. However, these two terminals can be exchanged because of symmetry between the source and drain of the transistor without departing from solutions of the present disclosure.

Furthermore, in the above embodiments, the sensing transistor M2 operates in a linear region in order to amplify the detected touch signal, and other transistors are switch transistors.

Figure 5:
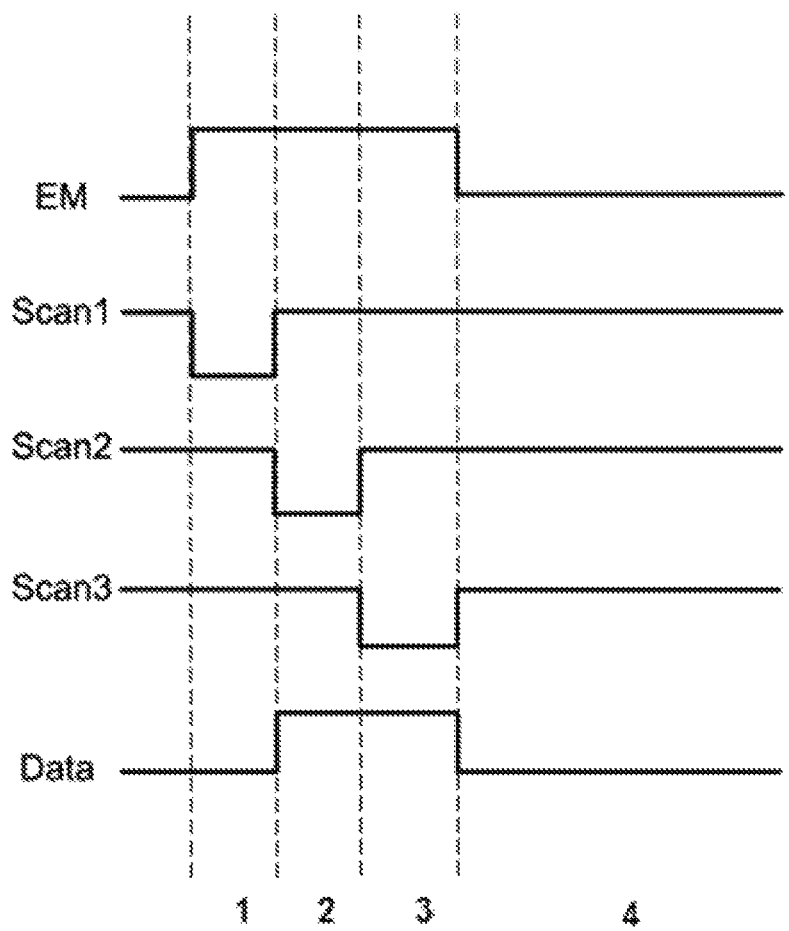
FIG. 5 exemplarily illustrates a timing relationship between signals being applicable to the pixel circuit illustrated in FIG. 4.

FIG. 5 exemplarily illustrates a timing relationship among signals being applicable to the pixel circuit illustrated in FIG. 4. Thereafter operating processes of the pixel circuit illustrated in FIG. 4 would be explained briefly by referring to the timing relationship among the signals illustrated in FIG. 5 in connection with exemplary operating views of the pixel circuit during respective phases illustrated in FIGS. 6A-6D. In FIGS. 6A-6D, the TFTs in dotted boxes denote the TFTs which are turned on, and an arrow denotes directions of currents in the each phase.

In a first operating phase of the pixel circuit, namely a resetting phase, as illustrated in FIG. 5, no data signal is provided on the data line DATA, the first scan line SCAN1 provides a low level, while the light emitting control line EM, the second scan line SCAN2 and the third scan line SCANS provide a high level.

Figure 6A:
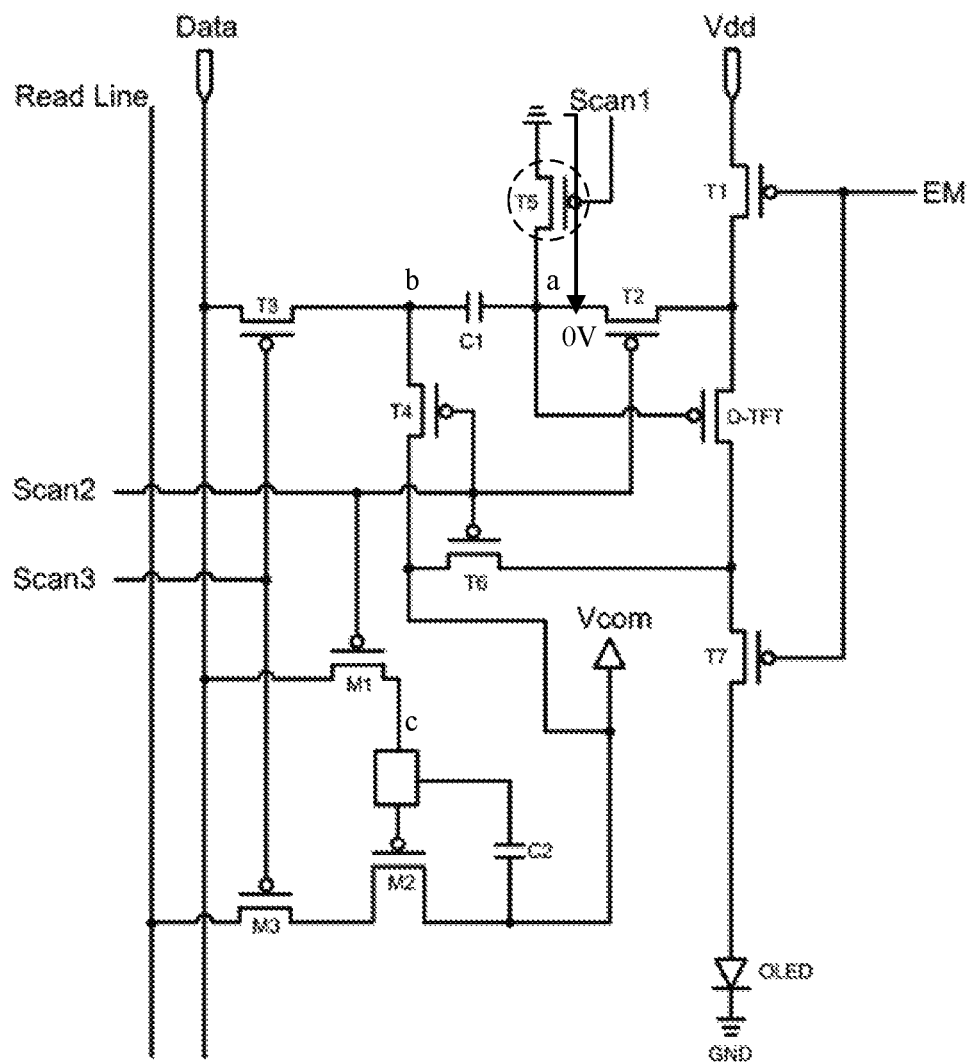
FIGS. 6A-6D exemplarily illustrate operating situations of the pixel circuit illustrated in FIG. 4 in respective phases according to the signal timing illustrated in FIG. 5.

By referring to FIG. 6A, in the display driving sub-circuit, because the first scan line SCAN1 provides the low level, the reset transistor T5 whose the gate is connected with the first scan line SCAN1 is turned on, the first node a is grounded and reset, a voltage at the first node a is 0V, so the previous potential at the first node a is reset. Meanwhile, no valid ON level is supplied to the gates of the transistors T1, T2, T3, T4, T6 and T7 in the display driving sub-circuit, therefore they are in a turning-off state.

In this phase, the respective transistors in the touch detection sub-circuit are also in the turning-off state.

In a second operating phase of the pixel circuit, namely a charging phase, as illustrated in FIG. 5, the first scan line SCAN starts to provide a high level instead of the low level, the second scan line SCAN2 starts to provide the low level instead of the high level, the light emitting control line EM and the third scan line SCANS are maintained at the high level, and the data line DATA provides the data voltage Vdata.

Figure 6B:
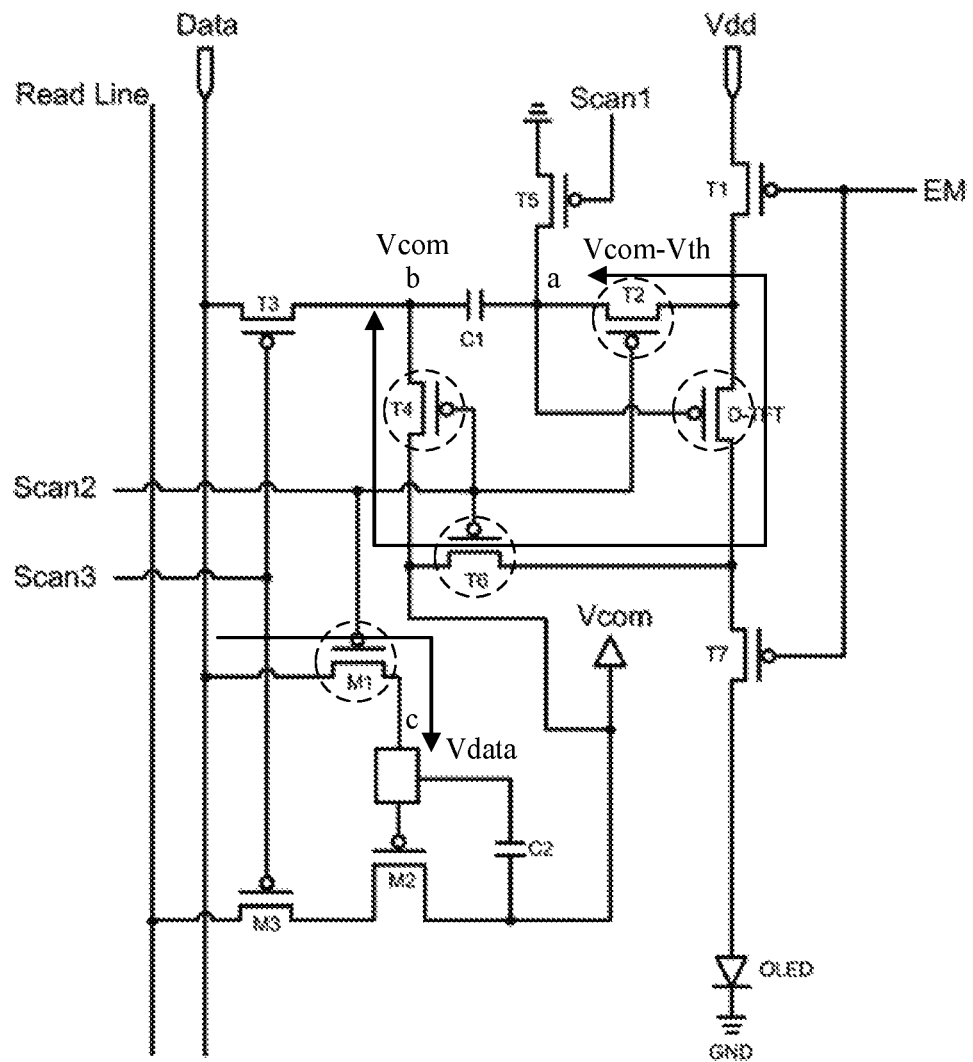

At this time, by referring to FIG. 6B, in the display driving sub-circuit, the first scan line SCAN1 provides the high level, the reset transistor T5 is turned off; the second scan line SCAN2 provides the low level, the first compensation transistor T2, the second compensation transistor T4 and the third compensation transistor T6 whose gates are connected to the second scan line SCAN2 are turned on, a potential on the third power supply line Vcom is transferred to the second node b and the drain of the driving transistor DTFT through the second compensation transistor T4 and the third compensation transistor T6, which are turned on, respectively; the first node a has been reset to the low level previously, so the driving transistor DTFT is turned on. In this case, the voltage Vcom transferred to the drain of the driving transistor DTFT starts to charge the first node a reversely via T6→DTFT→T2 until the first node a is charged to Vcom−Vth, wherein Vth denotes the threshold voltage of the driving transistor DTFT. During this process, the potential at the second node b is Vcom; after the charging is completed, the potential at the first node a is Vcom−Vth, a voltage difference across the compensation capacitor C1 is −Vth. Furthermore, the second light emitting control transistor T7 is turned off, so no current flows through the display element OLED, so that the aging of the OLED is slowed indirectly, and it also ensures that no current flows through the OLED except for in a light emitting phase.

Additionally, in the second phase, in the touch detection sub-circuit, the second scan line SCAN2 provides the low level, the pre-charging transistor M1 whose gate is connected to the second scan line SCAN2 is turned on, and the data line DATA provides the data voltage Vdata, so the touch unit is pre-charged in this process, a potential at the third node c is Vdata; the gate of the sensing transistor M2 is connected with the high level, the sensing transistor M2 is still in the turned-off state; the third scan line SCAN3 is maintained at the high level, so the output transistor M3 whose gate is connected to the third scan line SCAN3 is still in the turned-off state. This process is prepared for the touch detection.

In a third operating phase of the pixel circuit, namely a jumping phase, as illustrated in FIG. 5, the second scan line SCAN2 starts to provide the high level instead of the low level, the third scan line SCAN3 starts to provide the low level instead of the high level, the light emitting control line EM and the first scan line SCAN1 is maintained at the high level unchanged, and the data line DATA goes on to provide the data voltage Vdata.

Figure 6C:
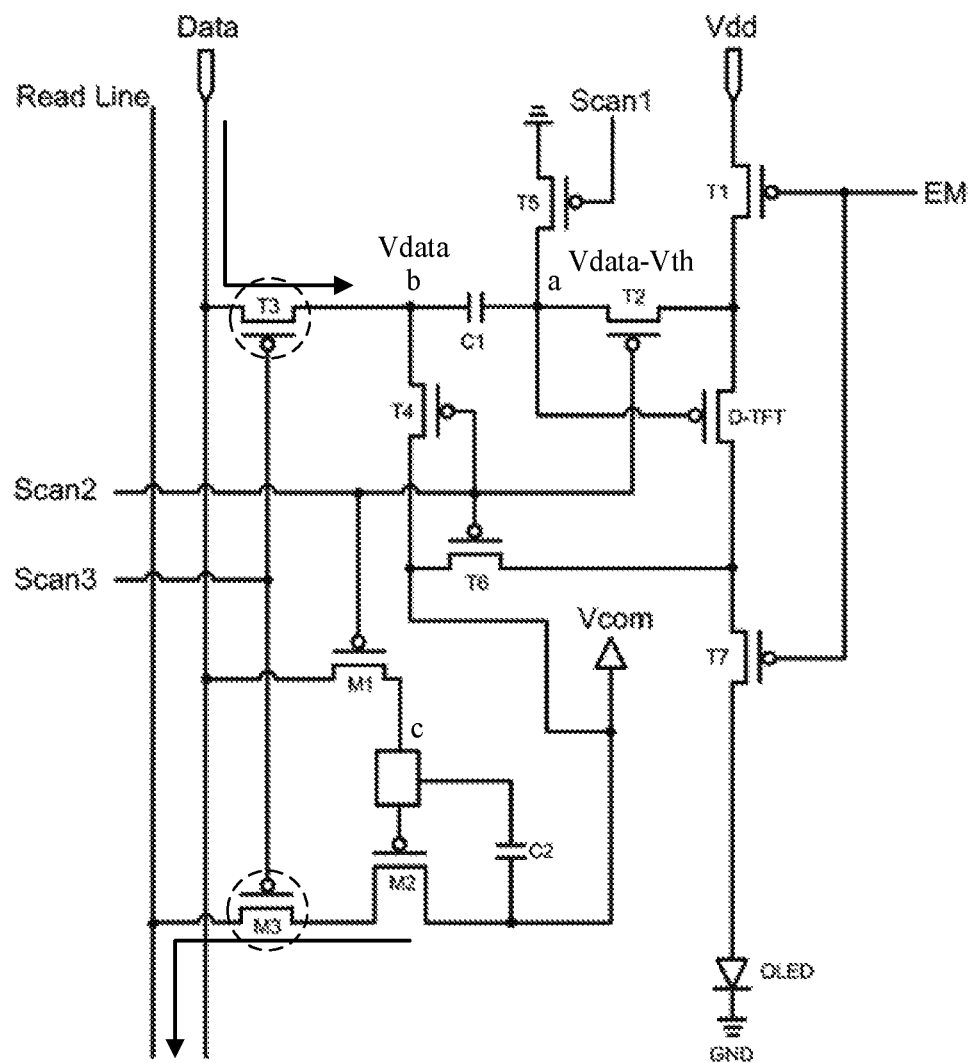

At this time, by referring to FIG. 6C, in the display driving sub-circuit, the second scan line SCAN2 provides the high level, so the transistors T2, T4 and T6 are turned off; the third scan line SCAN3 provides the low level, so the display data input transistor T3 whose gate is connected to the third scan line SCAN3 is turned on, the data voltage Vdata is provided to the second node b, so that a potential at the second terminal of the compensation capacitor C1 is Vdata; in order to maintain the voltage difference across the compensation capacitor C1 to be −Vth and unchanged, the potential at the first node a jumps to Vdata−Vth from Vcom−Vth, so that the voltage difference across the compensation capacitor C1 is maintained at −Vth and unchanged.

Figure 7:
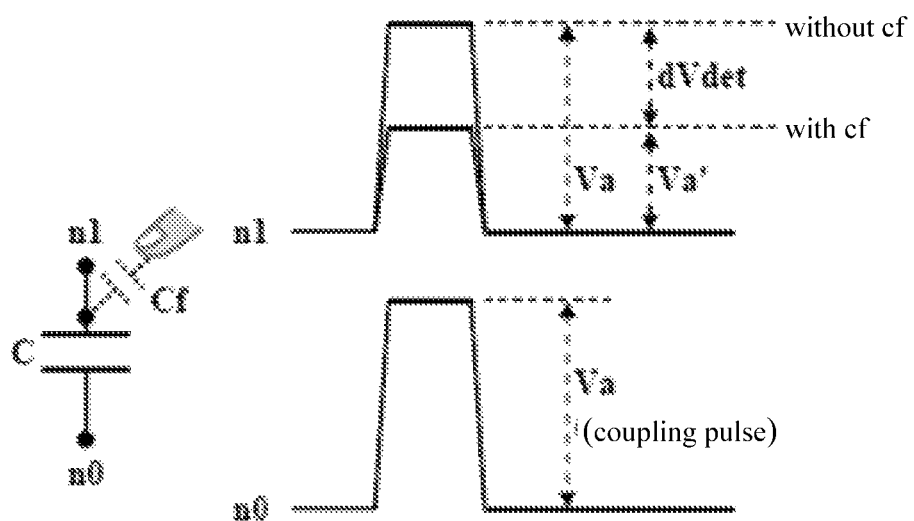
FIG. 7 exemplarily illustrates a principle for detecting a touch of a finger according to an embodiment of the present disclosure.

In this case, in the third phase, in the touch detection sub-circuit, the second scan line SCAN2 provides the high level, the pre-charging transistor M1 is turned off, and the third scan line SCAN3 provides the low level, so the output transistor M3 is turned on. When a touch occurs, for example, when the finger touches the display screen, a coupling capacitance is formed between the human's body and the touch sensing electrode, which leads to a decreasing of a potential at the gate of the sensing transistor M2 directly, and the M2 would be turned on when a gate-source voltage of the M2 satisfies a turned-on condition for the transistor. Particularly, by referring to the principle view illustrated in FIG. 7, when the finger touches, the coupling capacitance generated between the finger and the sensing electrode is superposed to an initial screen capacitor C, such that a potential at a point n1 drops. Referring to FIG. 6C back, that is to say, the potential at the gate of the sensing transistor M2 drops, so the sensing transistor M2 is turned on and enters into the linear amplifying region, amplifies the sense signal and provides the amplified sense signal to the output transistor M3. The amplified signal contributes to the collection of signal. The third scan line SCAN3 functions as a horizontal (direction X) scan line and the sense signal collection line READ LINE functions as a vertical (direction Y) scan line, so a position of the touch by the finger can be determined, that is, coordinates X, Y on the display screen. As described above, in this phase, the third scan line SCAN3 provides the low level, the output transistor M3 is turned on, therefore the coordinate position of the touch can be determined immediately whenever the touch occurs. Optionally, in this phase, the third power supply line Vcom supplies a coupling pulse signal to the second terminal of the storage capacitor C2.

In a fourth operating phase of the pixel circuit, namely a light emitting phase, as illustrated in FIG. 5, the light emitting control line EM provides the low level, the first to third scan line SCAN1 to SCAN3 provide the high level, and the data line DATA does not provide the data signal Vdata any more.

Figure 6D:
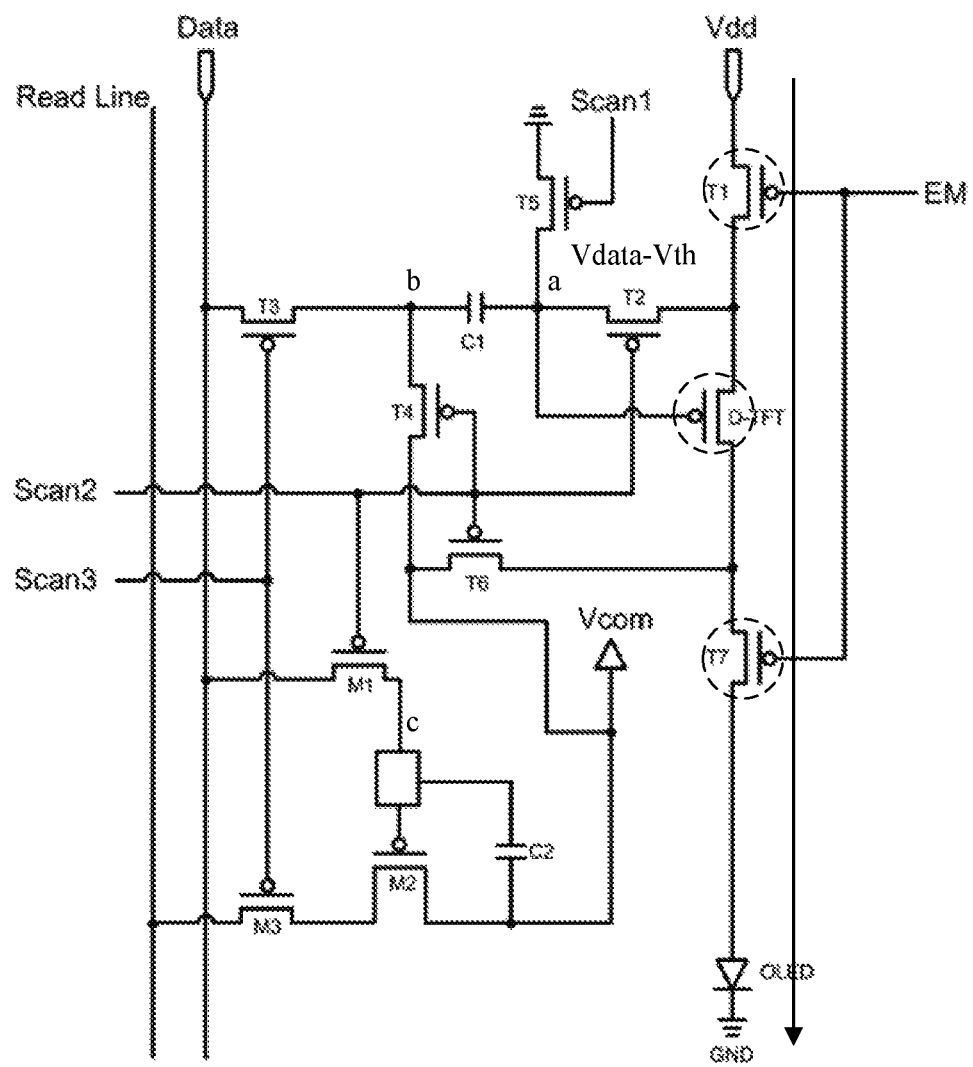

At this time, by referring to FIG. 6D, in the display driving sub-circuit, the respective compensation transistors T2, T4 and T6 are all in the turned-off state, the reset transistor T5 and the display data input transistor T3 are also in the turned-off state, while the first and second light emitting control transistors T1 and T7 are turned on and provide the power supply voltage Vdd to the source of the driving transistor DTFT, the voltage at the gate of the driving transistor DTFT is equal to the potential at the first node a, namely Vdata−Vth. Then, according to an equation for the saturation current of the driving transistor DTFT, it is as follows:

$$I_{DTFT} = K(V_{GS} - Vth)^2$$
$$= K[Vdd - (Vdata - Vth) - Vth]^2$$
$$= K(Vdd - Vdata)^2.$$

It can be seen from the above equation, the driving current $I_{DTFT}$ output from the driving transistor DTFT, that is, the operating current $I_{OLED}$ provided to the display element OLED, is independent of the Vth and is only related to the power supply voltage Vdd and the data voltage Vdata. Thus the influence of the threshold voltage Vth of the driving transistor DTFT on the operating current of the display element OLED is eliminated completely, which ensures the uniformity of a displayed image.

Figure 8:
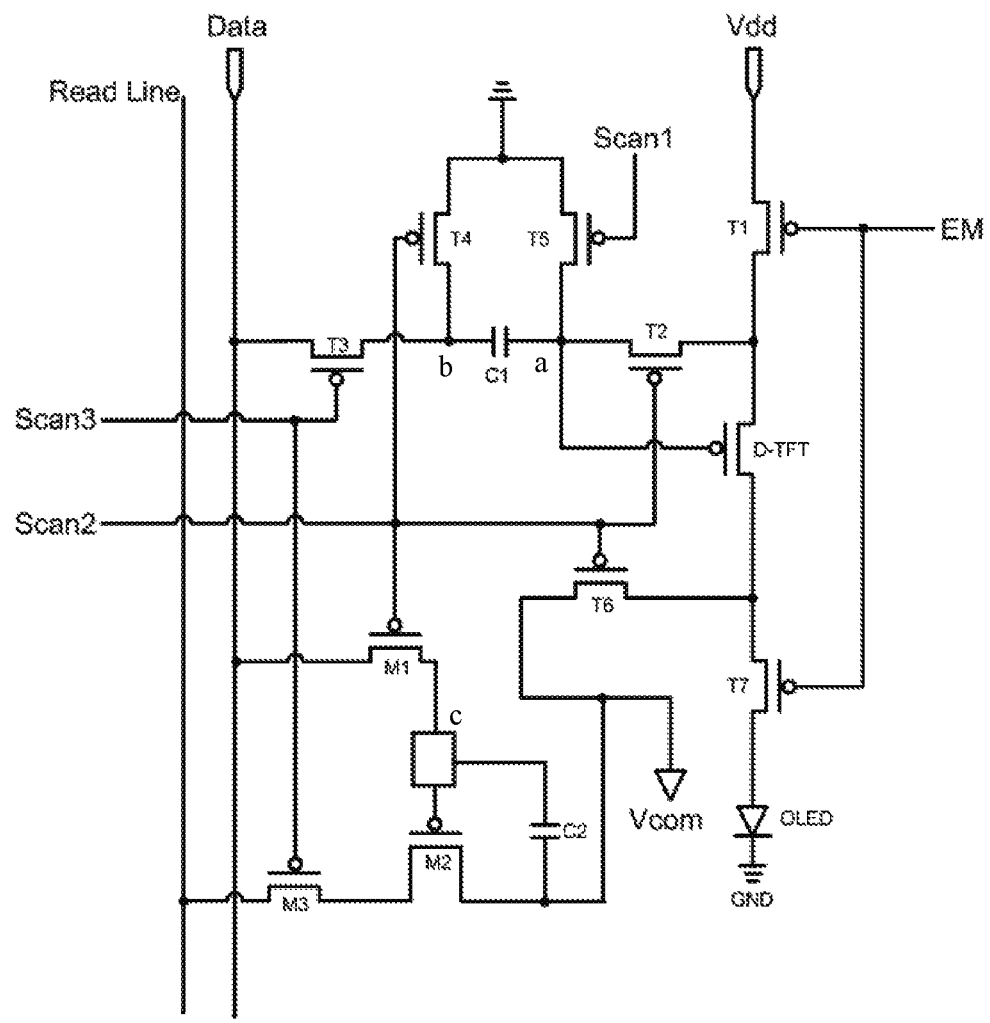
FIG. 8 exemplarily illustrates a specific structure of another pixel circuit according to an embodiment of the present disclosure.

As a variant, FIG. 8 exemplarily illustrates a structure of a pixel circuit according to another embodiment of the present disclosure. This pixel circuit is different from the one illustrated in FIG. 4 mainly in that connections for the second compensation transistor T4 are different slightly. As illustrated in FIG. 8, in this pixel circuit, the gate of the second compensation transistor T4 is connected with the second scan line SCAN2, the drain is connected with the second terminal of the compensation capacitor C1, namely the second node b, the source is connected with the first power supply line GND. Other structure and connection relationship in the circuit are substantively same as those in FIG. 4.

The pixel circuit in this embodiment may utilize the timing chart of the related signals illustrated in FIG. 5. Herein the operating process of the touch detection sub-circuit is substantively same as that of the touch detection sub-circuit described above in connection with FIGS. 6A-6D, so its detailed description would not be repeated herein. Thereafter the operating process of the display driving sub-circuit would be explained.

In a first operating phase of the pixel circuit, namely a resetting phase, as illustrated in FIG. 5, no data signal is provided on the data line DATA, the first scan line SCAN1 provides a low level, while the light emitting control line EM, the second scan line SCAN2 and the third scan line SCAN3 provide a high level.

At this time, in the display driving sub-circuit, because the first scan line SCAN1 provides the low level, the reset transistor T5 whose the gate is connected with the first scan line SCAN1 is turned on, the first node a is grounded and reset, a voltage at the first node a is 0V, so the previous potential at the first node a is reset. Meanwhile, no valid ON level is supplied to the gates of the transistors T1, T2, T3, T4, T6 and T7 in the display driving sub-circuit, therefore they are in a turning-off state.

In a second operating phase of the pixel circuit, namely a charging phase, as illustrated in FIG. 5, the first scan line SCAN starts to provide the high level instead of the low level, the second scan line SCAN2 starts to provide the low level instead of the high level, the light emitting control line EM and the third scan line SCAN3 is maintained at the high level unchanged, and the data line DATA provides the data voltage Vdata.

At this time, in the display driving sub-circuit, the first scan line SCAN1 provides the high level, the reset transistor T5 is turned off; the second scan line SCAN2 provides the low level, the first compensation transistor T2, the second compensation transistor T4 and the third compensation transistor T6 whose gates are connected to the second scan line SCAN2 are turned on, a potential on the third power supply line Vcom is transferred to the drain of the driving transistor DTFT through the third compensation transistor T6, which is turned on; the second node b is reset to the ground voltage 0V (GND) because the second compensation transistor T4 is turned on; the first node a has been reset to the low level previously, so the driving transistor DTFT is turned on. In this case, the voltage Vcom transferred to the drain of the driving transistor DTFT starts to charge the first node a reversely via T6→DTFT→T2 until the first node a is charged to Vcom−Vth, wherein Vth denotes the threshold voltage of the driving transistor DTFT. After the charging is completed, the potential at the first node a is Vcom−Vth, a voltage difference across the compensation capacitor C1 is −Vth. Furthermore, the second light emitting control transistor T7 is turned off, so no current flows through the display element OLED, so that the aging of the OLED is slowed indirectly, and it also ensures that no current flows through the OLED except for in a light emitting phase.

In a third operating phase of the pixel circuit, namely a jumping phase, as illustrated in FIG. 5, the second scan line SCAN2 starts to provide the high level instead of the low level, the third scan line SCAN3 starts to provide the low level instead of the high level, the light emitting control line EM and the first scan line SCAN1 is maintained at the high level unchanged, and the data line DATA goes on to provide the data voltage Vdata.

At this time, in the display driving sub-circuit, the second scan line SCAN2 provides the high level, so the transistors T2, T4 and T6 are turned off; the third scan line SCAN3 provides the low level, so the display data input transistor T3 whose gate is connected to the third scan line SCAN3 is turned on, the data voltage Vdata is provided to the second node b; in order to maintain the voltage difference across the compensation capacitor C1 to be Vcom−Vth and unchanged, the potential at the first node a jumps to Vcom−Vth+Vdata from Vcom−Vth, so that the voltage difference across the compensation capacitor C1 is maintained at Vcom−Vth unchanged.

In a fourth operating phase of the pixel circuit, namely a light emitting phase, as illustrated in FIG. 5, the light emitting control line EM provides the low level, the first to third scan line SCAN1 to SCANS provide the high level, and the data line DATA does not provide the data signal Vdata any more.

At this time, in the display driving sub-circuit, the respective compensation transistors T2, T4 and T6 are all in the turned-off state, the reset transistor T5 and the display data input transistor T3 are also in the turned-off state, while the first and second light emitting control transistors T1 and T7 are turned on and provide the power supply voltage Vdd to the source of the driving transistor DTFT, the voltage at the gate of the driving transistor DTFT is as same as the potential at the first node a, namely Vcom−Vth+Vdata. Then, according to a saturation equation for the current of the driving transistor DTFT, it obtains:

$$I_{DTFT} = K(V_{GS} - Vth)^2$$
$$= K[Vdd - (Vcom - Vth + Vdata) - Vth]^2$$
$$= K(Vdd - Vdata - Vcom)^2.$$

It can be seen from the above equation, the driving current $I_{DTFT}$ output from the driving transistor DTFT, that is, the operating current $I_{OLED}$ provided to the display element OLED, is not affected by the Vth and is only related to the power supply voltage Vdd, the data voltage Vdata and Vcom. Thus the influence of the threshold voltage Vth of the driving transistor DTFT on the operating current of the display element OLED is eliminated completely, which ensures the uniformity of a displayed image.

As a variant, FIG. 8 exemplarily illustrates a structure of a pixel circuit according to another embodiment of the present disclosure. This pixel circuit is different from the one illustrated in FIG. 4 mainly in that connections for the second compensation transistor T4 are different slightly. As illustrated in FIG. 8, in this pixel circuit, the gate of the second compensation transistor T4 is connected with the second scan line SCAN2, the drain connected with the second terminal of the compensation capacitor C1, namely the second node b, the source connected with the first power supply line GND. Other structure and connection relationship in the circuit are substantively same as those in FIG. 4.

The pixel circuit in this embodiment may utilize the timing chart of the related signals illustrated in FIG. 5. Wherein the operating process of the touch detection sub-circuit is substantively same as that of the touch detection sub-circuit described above in connection with FIGS. 6A-6D, so its detailed description would not be repeated herein. Thereafter the operating process of the display driving sub-circuit would be explained.

In a first operating phase of the pixel circuit, namely a resetting phase, as illustrated in FIG. 5, no data signal is provided on the data line DATA, the first scan line SCAN1 provides a low level, while the light emitting control line EM, the second scan line SCAN2 and the third scan line SCAN3 provide a high level.

At this time, in the display driving sub-circuit, because the first scan line SCAN1 provides the low level, the reset transistor T5 whose the gate is connected with the first scan line SCAN1 is turned on, the first node a is grounded and reset, a voltage at the first node a is 0V, so the previous potential at the first node a is reset. Meanwhile, no valid ON level is supplied to the gates of the transistors T1, T2, T3, T4, T6 and T7 in the display driving sub-circuit, therefore they are in a turning-off state.

In a second operating phase of the pixel circuit, namely a charging phase, as illustrated in FIG. 5, the first scan line SCAN starts to provide the high level instead of the low level, the second scan line SCAN2 starts to provide the low level instead of the high level, the light emitting control line EM and the third scan line SCAN3 is maintained at the high level unchanged, and the data line DATA provides the data voltage Vdata.

At this time, in the display driving sub-circuit, the first scan line SCAN1 provides the high level, the reset transistor T5 is turned off; the second scan line SCAN2 provides the low level, the first compensation transistor T2, the second compensation transistor T4 and the third compensation transistor T6 whose gates are connected to the second scan line SCAN2 are turned on, a potential on the third power supply line Vcom is transferred to the drain of the driving transistor DTFT through the third compensation transistor T6, which is turned on; the second node b is reset to the ground voltage 0V (GND) because the second compensation transistor T4 is turned on; the first node a has been reset to the low level previously, so the driving transistor DTFT is turned on. In this case, the voltage Vcom transferred to the drain of the driving transistor DTFT starts to charge the first node a reversely via T6→DTFT→T2 until the first node a is charged to Vcom−Vth, wherein Vth denotes the threshold voltage of the driving transistor DTFT. After the charging is completed, the potential at the first node a is Vcom−Vth, a voltage difference across the compensation capacitor C1 is −Vth. Furthermore, the second light emitting control transistor T7 is turned off, so no current flows through the display element OLED, so that the aging of the OLED is slowed indirectly, and it also ensures that no current flows through the OLED except for in a light emitting phase.

In a third operating phase of the pixel circuit, namely a jumping phase, as illustrated in FIG. 5, the second scan line SCAN2 starts to provide the high level instead of the low level, the third scan line SCAN3 starts to provide the low level instead of the high level, the light emitting control line EM and the first scan line SCAN1 are maintained at the high level and unchanged, and the data line DATA goes on to provide the data voltage Vdata.

At this time, in the display driving sub-circuit, the second scan line SCAN2 provides the high level, so the transistors T2, T4 and T6 are turned off; the third scan line SCAN3 provides the low level, so the display data input transistor T3 whose gate is connected to the third scan line SCAN3 is turned on, the data voltage Vdata is provided to the second node b; in order to maintain the voltage difference across the compensation capacitor C1 to be Vcom−Vth and unchanged, the potential at the first node a jumps to Vcom−Vth+Vdata from Vcom−Vth, so that the voltage difference across the compensation capacitor C1 is maintained at Vcom−Vth and unchanged.

In a fourth operating phase of the pixel circuit, namely a light emitting phase, as illustrated in FIG. 5, the light emitting control line EM provides the low level, the first to third scan line SCAN1 to SCAN3 provide the high level, and the data line DATA does not provide the data signal Vdata any more.

At this time, in the display driving sub-circuit, the respective compensation transistors T2, T4 and T6 are all in the turned-off state, the reset transistor T5 and the display data input transistor T3 are also in the turned-off state, while the first and second light emitting control transistors T1 and T7 are turned on and provide the power supply voltage Vdd to the source of the driving transistor DTFT, the voltage at the gate of the driving transistor DTFT is equal to the potential at the first node a, namely Vcom−Vth+Vdata. Then, according to the equation for the saturation current of the driving transistor DTFT, it is as follows:

$$I_{DTFT} = K(V_{GS} - Vth)^2$$
$$= K[Vdd - (Vcom - Vth + Vdata) - Vth]^2$$
$$= K(Vdd - Vdata - Vcom)^2.$$

It can be seen from the above equation, the driving current $I_{DTFT}$ output from the driving transistor DTFT, that is, the operating current $I_{OLED}$ provided to the display element OLED, is independent of the Vth and is only related to the power supply voltage Vdd, the data voltage Vdata and Vcom. Thus the influence of the threshold voltage Vth of the driving transistor DTFT on the operating current of the display element OLED is eliminated completely, which ensures the uniformity of a displayed image.

Figure 9:
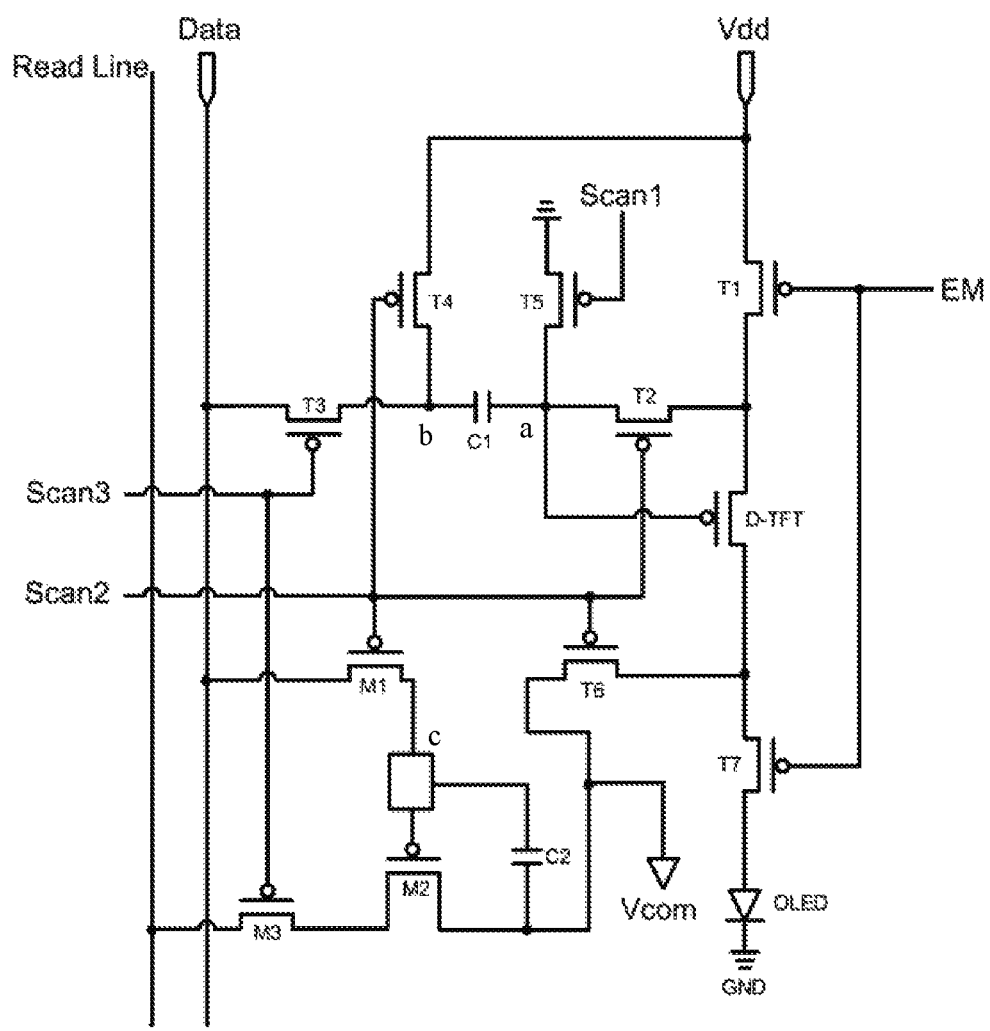
FIG. 9 exemplarily illustrates a specific structure of another pixel circuit according to an embodiment of the present disclosure.

As a variant, FIG. 9 exemplarily illustrates a structure of a pixel circuit according to another embodiment of the present disclosure. This pixel circuit is different from the one illustrated in FIG. 4 mainly in that connections for the second compensation transistor T4 are different slightly. As illustrated in FIG. 9, in this pixel circuit, the gate of the second compensation transistor T4 is connected with the second scan line SCAN2, the drain connected with the second terminal of the compensation capacitor C1, namely the second node b, the source connected with the first power supply line Vdd. Other structure and connection relationship in the circuit are substantively same as those in FIG. 4.

The pixel circuit in this embodiment may utilize the timing chart of the related signals illustrated in FIG. 5. Wherein the operating process of the touch detection sub-circuit is substantively same as that of the touch detection sub-circuit described above in connection with FIGS. 6A-6D, so its detailed description would not be repeated herein. Thereafter the operating process of the display driving sub-circuit would be explained.

In a first operating phase of the pixel circuit, namely a resetting phase, as illustrated in FIG. 5, no data signal is provided on the data line DATA, the first scan line SCAN1 provides a low level, while the light emitting control line EM, the second scan line SCAN2 and the third scan line SCANS provide a high level.

At this time, in the display driving sub-circuit, because the first scan line SCAN1 provides the low level, the reset transistor T5 whose the gate is connected with the first scan line SCAN1 is turned on, the first node a is grounded and reset, a voltage at the first node a is 0V, so the previous potential at the first node a is reset. Meanwhile, no valid ON level is supplied to the gates of the transistors T1, T2, T3, T4, T6 and T7 in the display driving sub-circuit, therefore they are in a turning-off state.

In a second operating phase of the pixel circuit, namely a charging phase, as illustrated in FIG. 5, the first scan line SCAN starts to provide the high level instead of the low level, the second scan line SCAN2 starts to provide the low level instead of the high level, the light emitting control line EM and the third scan line SCAN3 is maintained at the high level and unchanged, and the data line DATA provides the data voltage Vdata.

At this time, in the display driving sub-circuit, the first scan line SCAN1 provides the high level, the reset transistor T5 is turned off; the second scan line SCAN2 provides the low level, the first compensation transistor T2, the second compensation transistor T4 and the third compensation transistor T6 whose gates are connected to the second scan line SCAN2 are turned on, a potential on the third power supply line Vcom is transferred to the drain of the driving transistor DTFT through the third compensation transistor T6, which is turned on; the second node b is charged to the power supply voltage Vdd because the second compensation transistor T4 is turned on; the first node a has been reset to the low level previously, so the driving transistor DTFT is turned on. In this case, the voltage Vcom transferred to the drain of the driving transistor DTFT starts to charge the first node a reversely via T6→DTFT→T2 until the first node a is charged to Vcom−Vth, wherein Vth denotes the threshold voltage of the driving transistor DTFT. After the charging is completed, the potential at the first node a is Vcom−Vth, a voltage difference across the compensation capacitor C1 is Vcom−Vth−Vdd. Furthermore, the second light emitting control transistor T7 is turned off, so no current flows through the display element OLED, so that the aging of the OLED is slowed indirectly, and it also ensures that no current flows through the OLED except for in a light emitting phase.

In a third operating phase of the pixel circuit, namely a jumping phase, as illustrated in FIG. 5, the second scan line SCAN2 starts to provide the high level instead of the low level, the third scan line SCAN3 starts to provide the low level instead of the high level, the light emitting control line EM and the first scan line SCAN1 is maintained at the high level and unchanged, and the data line DATA goes on to provide the data voltage Vdata.

At this time, in the display driving sub-circuit, the second scan line SCAN2 provides the high level, so the transistors T2, T4 and T6 are turned off; the third scan line SCAN3 provides the low level, so the display data input transistor T3 whose gate is connected to the third scan line SCAN3 is turned on, the data voltage Vdata is provided to the second node b; in order to maintain the voltage difference across the compensation capacitor C1 to be Vcom−Vth−Vdd and unchanged, the potential at the first node a jumps to Vcom−Vth−Vdd+Vdata from Vcom−Vth, so that the voltage difference across the compensation capacitor C1 is maintained at Vcom−Vth−Vdd and unchanged.

In a fourth operating phase of the pixel circuit, namely a light emitting phase, as illustrated in FIG. 5, the light emitting control line EM provides the low level, the first to third scan line SCAN1 to SCAN3 provide the high level, and the data line DATA does not provide the data signal Vdata any more.

At this time, in the display driving sub-circuit, the respective compensation transistors T2, T4 and T6 are all in the turned-off state, the reset transistor T5 and the display data input transistor T3 are also in the turned-off state, while the first and second light emitting control transistors T1 and T7 are turned on and provide the power supply voltage Vdd to the source of the driving transistor DTFT, the voltage at the gate of the driving transistor DTFT is equal to the potential at the first node a, namely Vcom−Vth−Vdd+Vdata. Then, according to the equation for the saturation current of the driving transistor DTFT, it obtains:

$$I_{DTFT} = K(V_{GS} - Vth)^2$$
$$= K[Vdd - (Vcom - Vth - Vdd + Vdata) - Vth]^2$$
$$= K(2Vdd - Vdata - Vcom)^2.$$

It can be seen from the above equation, the driving current $I_{DTFT}$ output from the driving transistor DTFT, that is, the operating current $I_{OLED}$ provided to the display element OLED, is independent of the Vth and is only related to the power supply voltage Vdd, the data voltage Vdata and Vcom. Thus the influence of the threshold voltage Vth of the driving transistor DTFT on the operating current of the display element OLED is eliminated completely, which ensures the uniformity of a displayed image.

Optionally, in the pixel circuit illustrated in FIGS. 4, 8 and 9, all transistors included in the display driving sub-circuit and the touch detection unit are TFTs of P type, so that the manufacture process can be simplified greatly and the production efficiency is increased.

Figure 10:
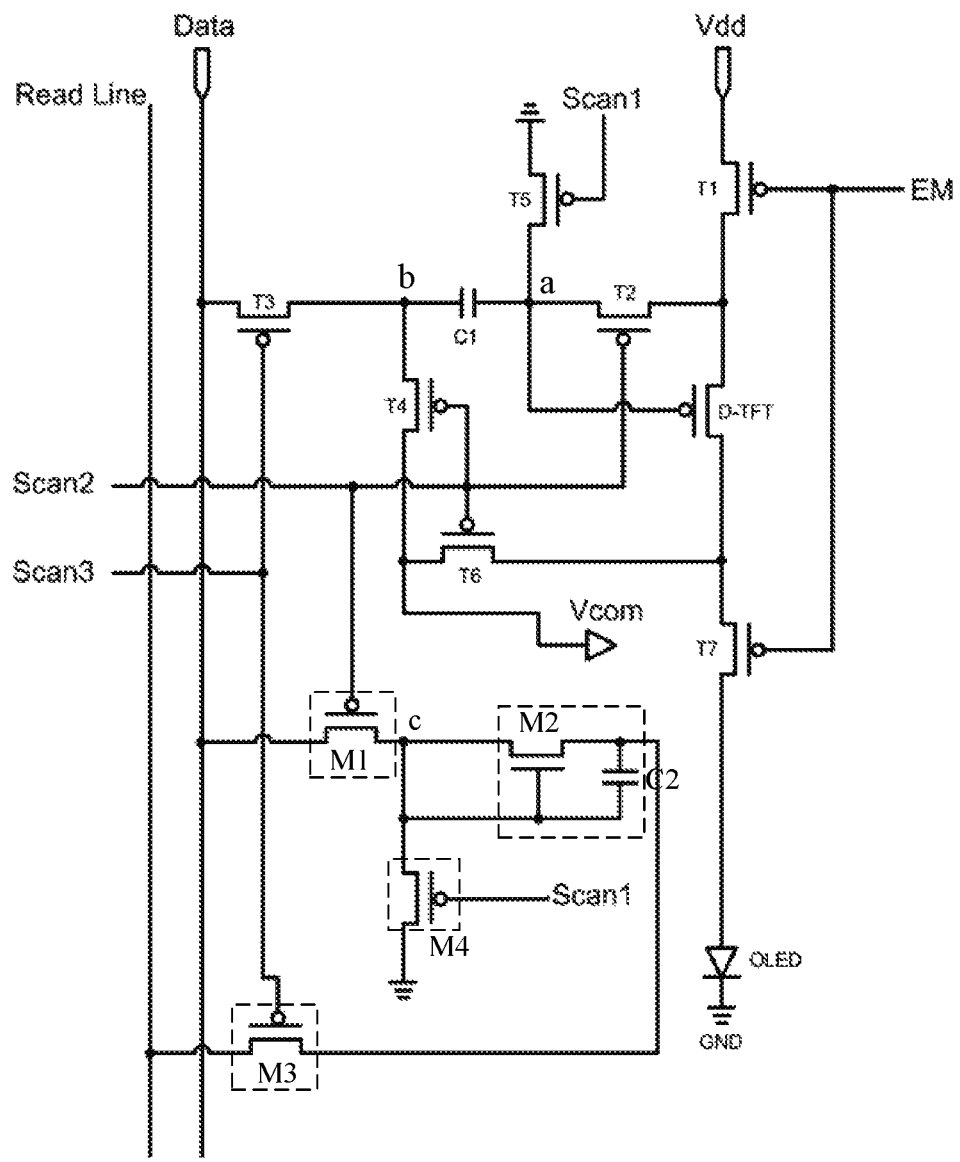
FIG. 10 exemplarily illustrates a specific structure of another pixel circuit according to an embodiment of the present disclosure.

FIG. 10 exemplarily illustrates a structure of a pixel circuit according to another embodiment of the present disclosure. The pixel circuit in this embodiment is different from that in FIG. 4 mainly in that of the touch detection sub-circuit, while the structure and connection relationship for the display driving sub-circuit is similar to that illustrated in FIG. 4. Particularly, the touch detection sub-circuit illustrated in FIG. 3C is utilized in this pixel circuit, wherein the capacitive touch unit is replaced with the photosensitive touch unit.

Optionally, as illustrated in FIG. 10, in the touch detection sub-circuit, the pre-charging unit comprises: a pre-charging transistor M1 having a gate connected with the second scan line SCAN2, a source connected with the data line DATA and a drain connected with the third node c.

Optionally, in the touch detection sub-circuit, the touch sensing unit comprises: a photosensitive transistor M2 having a gate and a source connected with the third node c; and a storage capacitor C2 having a first terminal connected with a drain of the photosensitive transistor M2, and a second terminal connected with the third node c.

Optionally, in the touch detection sub-circuit, the sense signal output unit comprises an output transistor M3 having a gate connected with the third scan line SCANS, a source connected with the first terminal of the storage capacitor C2, and a drain connected with the sense signal collection line READ LINE.

Optionally, in the touch detection sub-circuit, the touch reset unit comprises a touch reset transistor M4 having a gate connected with the first scan line, a source connected with the third node, and a drain connected with the first power supply line GND.

As an example, in the touch detection sub-circuit illustrated in FIG. 10, the transistors M1, M3 and M4 are TFTs of P type, and the photosensitive transistor M2 is a TFT of N type. However, it is obvious for those skilled in the art that other transistors of different types can also be utilized to form the touch detection sub-circuit according to the description below without departing from the scope of the present disclosure.

In the pixel circuit illustrated in FIG. 10, the operating process of the display driving sub-circuit is substantively same as that described by referring to FIG. 4, so the specific timing and operating principle would not be repeated herein. Thereafter the operating process of the touch detection sub-circuit in the pixel circuit illustrated in FIG. 10 would be explained briefly in connection with the timing relationship among the signals illustrated in FIG. 5.

In a first operating phase of the pixel circuit, namely a resetting phase, as illustrated in FIG. 5, no data signal is provided on the data line DATA, the first scan line SCAN1 provides a low level, while the light emitting control line EM, the second scan line SCAN2 and the third scan line SCAN3 provide a high level.

In this phase, in the touch detection sub-circuit, the touch reset transistor M4 is turned on since its gate receives the low level supplied from the first scan line SCAN1, so that the second terminal of the storage capacitor C2, namely the third node c is reset, which is prepared for the light sensing operation followed. Other transistors M1, M2 and M3 are in the turned-off state.

In a second operating phase of the pixel circuit, namely a charging phase, as illustrated in FIG. 5, the first scan line SCAN starts to provide a high level instead of the low level, the second scan line SCAN2 starts to provide the low level instead of the high level, the light emitting control line EM and the third scan line SCAN3 is maintained at the high level and unchanged, and the data line DATA provides the data voltage Vdata.

In the touch detection sub-circuit, the transistor M4 is turned off because the first scan line SCAN1 supplies the high level; the second scan line SCAN2 supplies the low level, the pre-charging transistor M1 whose the gate is connected with the second scan line SCAN2 is turned on, and the data line DATA supplies the data voltage Vdata, this process pre-charges the touch unit, that is, the third node c is pre-charged to Vdata. The Vdata from the data line DATA is written into the second terminal of the storage capacitor C2. The Vdata from the data line DATA causes the sensing transistor M2 be turned on to sense the touch signal; because the third scan line SCAN3 is maintained at the high level, the output transistor M3 whose the gate is connected with the third scan line SCAN3 is in the turned-off state. This phase is prepared for the touch detection.

In a third operating phase of the pixel circuit, namely a jumping phase, as illustrated in FIG. 5, the second scan line SCAN2 starts to provide the high level instead of the low level, the third scan line SCAN3 starts to provide the low level instead of the high level, the light emitting control line EM and the first scan line SCAN1 are maintained at the high level and unchanged, and the data line DATA goes on to provide the data voltage Vdata.

In the touch detection sub-circuit, the second scan line SCAN2 provides the high level, so the pre-charging transistor M1 is turned off, the third node c, namely the second terminal of the storage capacitor C2 is maintained at the previous level Vdata, and the photosensitive transistor M2 is maintained to be turned on so as to output the coupling voltage Vdata. If a photosensitive signal is generated because a touch occurs, the photosensitive transistor M2 writes the sensing voltage to the first terminal of the storage capacitor C2. In particularly, by a potential transformation, the photosensitive transistor M2 causes the voltage at the first terminal of the storage capacitor C2 to be a sum of the Vdata from the data line DATA and the sensing voltage corresponding to the photosensitive signal, and the voltage at the second terminal of the storage capacitor C2 is the Vdata from the data line DATA, therefore a voltage difference across the storage capacitor C2 is the sensing voltage. Because the third scan line SCAN3 supplies the low level, the output transistor M3 is turned on to output the sense signal stored on the storage capacitor C2 to the sense signal collection line READ LINE, and C2→M3→READ LINE forms a path. Optionally, an amplifier may be disposed at a terminal of the sense signal collection line READ LINE in order to amplify the sense signal output from the sense signal collection line READ LINE, which would be processed and analyzed by a data processing unit in the display apparatus. Variation in signal intensity before and after the touch occurs is compared with a threshold as no touch occurs, so it can be judged whether the touch occurs and the touch position can be determined, wherein the X-direction coordination is determined by the third scan line SCAN3, and the Y-direction coordination is determined by the sense signal collection line READ LINE.

In a fourth operating phase of the pixel circuit, namely a light emitting phase, as illustrated in FIG. 5, the light emitting control line EM provides the low level, the first to third scan line SCAN1 to SCAN3 provide the high level, and the data line DATA does not provide the data signal Vdata any more.

In the touch detection sub-circuit, the transistors are in the turned-off state so the display of the pixel would not be affected.

As a variant, according to another embodiment of the present disclosure, in the pixel circuit illustrated in the FIG. 10, the display driving sub-circuit may be replaced with the display driving sub-circuit in the pixel circuit illustrated in FIG. 8 or 9, and the threshold voltage of the driving transistor DTFT can also be compensated for and the influence of the drifting of the threshold voltage Vth of the driving transistor DTFT on the operating current of the display element OLED can be eliminated, which ensures the uniformity of a displayed image. Further, the photosensitive touch and the AMOLED display are integrated, which increases a degree of a system integration. In this case, the operating process of the display driving sub-circuit is substantively same as that described by referring to FIG. 8 or 9, and details would not be repeated herein.

According to another aspect of the present disclosure, there is further provided an array substrate comprising the any one of the pixel circuits described above.

According to a still aspect of the present disclosure, there is further provided a display apparatus comprising any one of the array substrates described above. The display apparatus may be an AMOLED display, a TV, a digital photo frame, a mobile phone, a tablet computer and any product or part having the display function.

Figure 11:
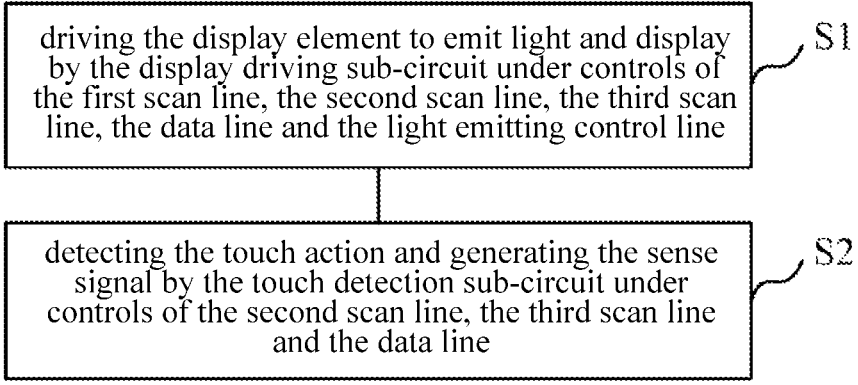
FIG. 11 is a general flowchart of a driving method being applicable to the above pixel circuits according to the embodiments of the present disclosure.

According to a further aspect, there is further provided a driving method for the pixel circuit described above, as illustrated in FIG. 11, comprising: driving the display element OLED to emit light for display by the display driving sub-circuit, under the control of the first scan line SCAN1, the second scan line SCAN2, the third scan line SCAN3, the data line DATA and the light emitting control line EM; and detecting the touch action and generating the sense signal by the touch detection sub-circuit under controls of the second scan line SCAN2, the third scan line SCAN3 and the data line DATA.

Figure 12:
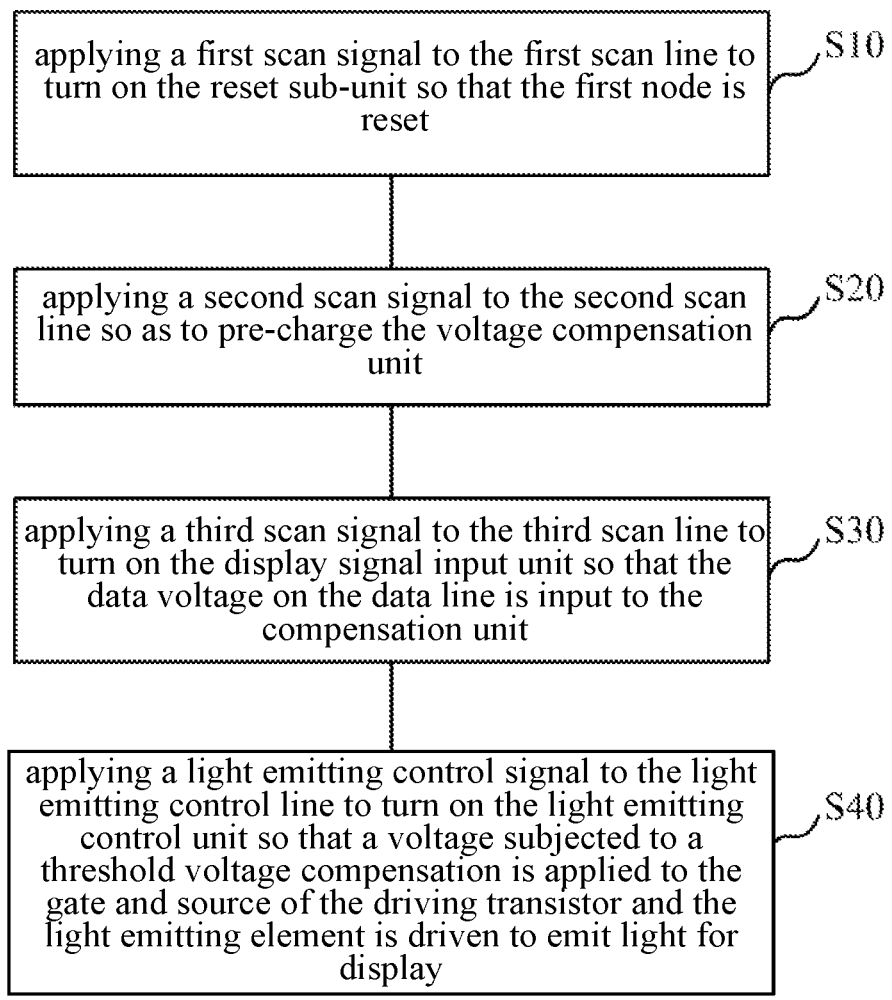
FIG. 12 is a flowchart for a method applicable to a display driving sub-circuit in the driving method according to the embodiment of the present disclosure

Optionally, as illustrated in FIG. 12, driving the display element to emit light for display by the display driving sub-circuit comprises: applying a first scan signal to the first scan line to turn on the reset sub-unit so that the first node is reset; applying a second scan signal to the second scan line so as to pre-charge the compensation unit; applying a third scan signal to the third scan line to turn on the display signal input unit, so that the data voltage on the data line is input to the compensation unit; and applying a light emitting control signal to the light emitting control line to turn on the light emitting control unit, so that a voltage subjected to a threshold voltage compensation is applied to the gate and source of the driving transistor, and the light emitting element is driven to emit light for display.

Optionally, applying a first scan signal to the first scan line so as to reset the first node a comprises: turning on the reset transistor T5 by the first scan signal, so that the first node a is grounded.

Optionally, applying a second scan signal to the second scan line so as to pre-charge the compensation unit comprises: turning on the first, second and third compensation transistors T2, T4 and T6 by the second scan signal, pre-charging the compensation capacitor in the compensation unit, so that an information including the threshold voltage of the driving transistor DTFT is written into the compensation capacitor.

Optionally, applying a third scan signal to the third scan line so as to input the data voltage on the data line to the compensation unit comprises: turning on the display data input transistor T3 by the third scan signal, so that the data voltage is written into the compensation capacitor and the data voltage is compensated for by the compensation capacitor.

Optionally, applying a light emitting control signal to the light emitting control line so as to drive the light emitting element to emit light for display by the driving transistor comprising: turning on the first light emitting control transistor T1 and the second light emitting control transistor T2 by the light emitting control signal, so that the data voltage subjected to the threshold voltage compensation is applied between the gate and source of the driving transistor, the driving transistor is turned on to drive the light emitting element to emit light for display.

Figure 13:
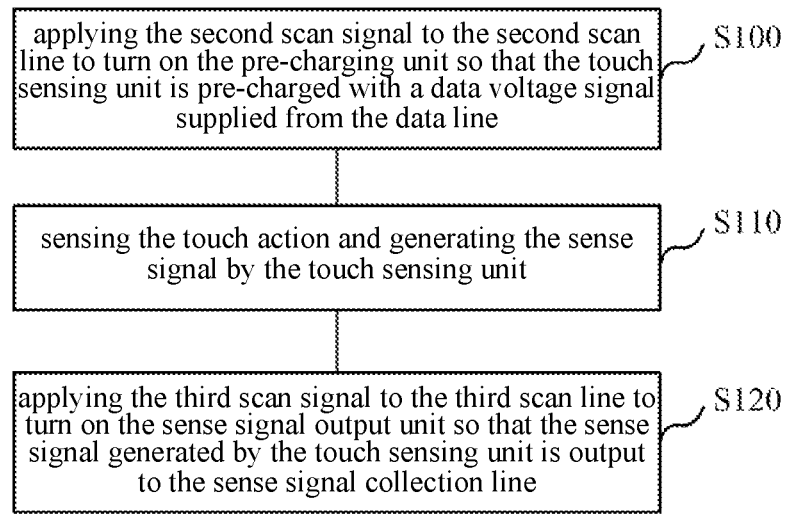
FIG. 13 is a flowchart for a method applicable to a touch detection sub-circuit in the driving method according to the embodiment of the present disclosure.

According to an embodiment of the present disclosure, when the capacitive touch principle is utilized, as illustrated in FIG. 13, detecting the touch action and generating the sense signal by the touch detection sub-circuit comprises: applying the second scan signal to the second scan line so as to turn on the pre-charging unit, the touch sensing unit is pre-charged with a data voltage signal supplied on the data line; sensing the touch action and generating the sense signal by the touch sensing unit; and applying the third scan signal to the third scan line so as to turn on sense signal output unit, the sense signal generated by the touch sensing unit is output to the sense signal collection line.

Optionally, applying the second scan signal to the second scan line so as to pre-charging the touch sensing unit with a data voltage signal comprises: turning on the pre-charging transistor M1 by the second scan signal and loading the data voltage signal to the touch sensing unit.

Optionally, sensing the touch action by the touch sensing unit comprising: sensing, by the sensing transistor, the variation in the level caused by the touch action and amplifying an amount of voltage variation caused by the touch action to generate the sense signal.

Optionally, applying the third scan signal to the third scan line so as to output the sense signal by the sensing signal output unit to the sense signal collection line: turning on the output transistor M3 by the third scan signal; and outputting the sense signal generated by the touch sensing unit to the sense signal collection line READ LINE.

Figure 14:
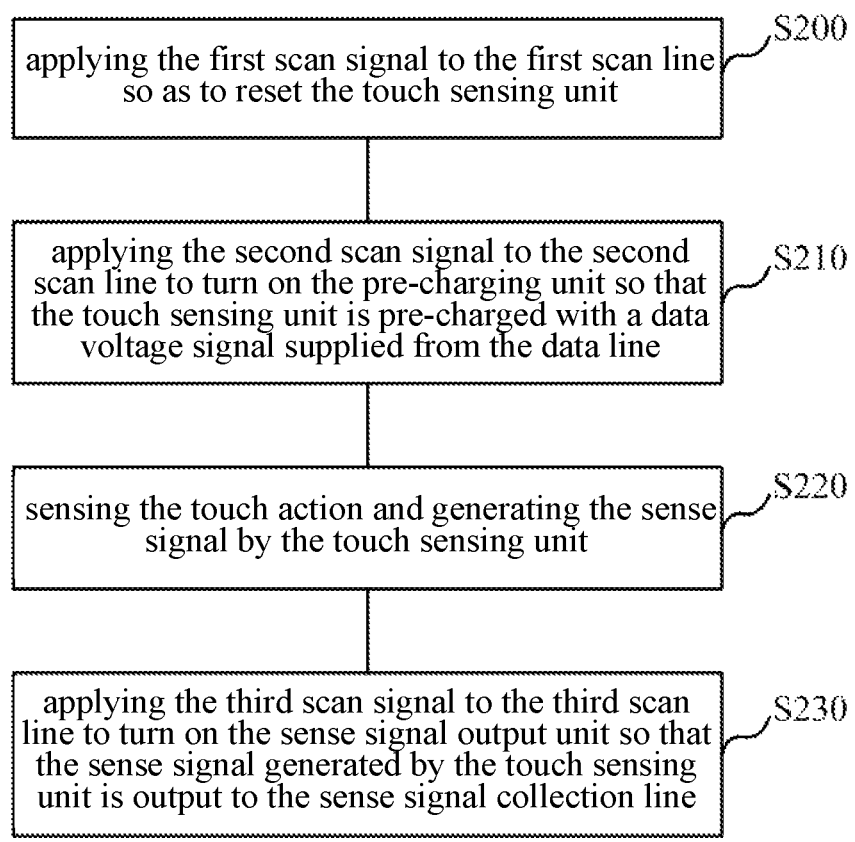
FIG. 14 is a flowchart for another method being applicable to a touch detection sub-circuit in the driving method according to the embodiment of the present disclosure.

According to another embodiment of the present disclosure, when the photosensitive principle is utilized, as illustrated in FIG. 14, detecting the touch action and generating the sense signal by the touch detection sub-circuit comprises: applying the first scan signal to the first scan line so as to reset the touch sensing unit; applying the second scan signal to the second scan line so as to turn on the pre-charging unit, the touch sensing unit is pre-charged with a data voltage signal supplied from the data line; sensing the touch action and generating the sense signal by the touch sensing unit; and applying the third scan signal to the third scan line so as to turn on sense signal output unit, so that the sense signal generated by the touch sensing unit is output to the sense signal collection line.

Optionally, applying the first scan signal to the first scan line so as to reset the touch sensing unit comprises: turning on the touch reset transistor M4 by the first scan signal, so that the first terminal of the storage capacitor C2 is grounded.

Optionally, applying the second scan signal to the second scan line so as to turn on the pre-charging unit, so that the touch sensing unit is pre-charged with a data voltage signal supplied from the data line comprises: turning on the pre-charging transistor M1 by the second scan signal; loading the data voltage signal Vdata to the gate of the photosensitive transistor M2 and the first terminal of the storage capacitor, so that the photosensitive transistor M2 is turned on.

Optionally, sensing the touch action by the touch sensing unit comprises: changing the voltage at the source of the photosensitive transistor M2 due to the photosensitive touch, so that the sensing transistor M2 generates the sense signal and writes the sense signal into the second terminal of the storage capacitor C2.

Optionally, applying the third scan signal to the third scan line so as to output the sense signal by the sensing signal output unit to the sense signal collection line comprises: turning on the output transistor M3 by the third scan signal and outputting the sense signal stored on the storage capacitor to the sense signal collection line READ LINE.

In summary, the pixel circuit and the driving method thereof according to the embodiments of the present disclosure can compensate for the threshold voltage of the driving TFT, eliminate an influence of un-uniformity of the threshold voltage in the respective driving TFTs on a driving current flowing through the OLED due to the manufacture process and the aging, and ensures an uniformity of the display, so that a display effect can be improved. Meanwhile, the touch detection unit is incorporated into the pixel circuit, for example, the capacitive touch detection unit or the photosensitive touch detection unit, so that an integration between the AMOLED and the In Cell touch can be realized, which reduces a size of the product and increases a degree of a system integration.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

This application claims priority to a Chinese Patent Application No. 201510221341.6, filed on May 4, 2015, in the China's State Intellectual Property Office, the disclosure of which is incorporated by reference herein as a whole.

What is claimed is:
1. A pixel circuit comprising a display driving sub-circuit (200) and a touch detection sub-circuit (210),
wherein the display driving sub-circuit (200) is connected with a data line (DATA), a light emitting control line (EM) and a plurality of scan lines, and is configured to drive a display element to emit light for display under controls of the data line, the light emitting control line and the plurality of scan lines; and the touch detection sub-circuit (210) is configured to share the data line (DATA) and some of the plurality of scan lines (SCAN2, SCAN3) with the display driving sub-circuit, and to detect a touch action and generate a sense signal under controls of the data line and the some of the plurality of scan lines (SCAN2, SCAN3), wherein the touch detection sub-circuit comprises a pre-charging unit (340), connected with the data line and a second scan line (SCAN2), and configured to pre-charge with a level provided from the data line under the control of the second scan line.

2. The pixel circuit of claim 1, wherein the display driving sub-circuit comprises:

a display driving reset unit (300), connected with a first scan line (SCAN1) and a first node (a) and configured to reset the first node under a control of the first scan line;

a driving transistor (DTFT) having a control terminal connected with the first node, configured to drive the display element to emit light for display according to a level at the first node;

a light emitting control unit (310), connected with a light emitting control line (EM), a first terminal and a second terminal of the driving transistor, and configured to control the driving transistor to drive the display element to emit light for display according to a signal input from the light emitting control line;

a compensation unit (320), connected with the first node, the driving transistor and the light emitting control unit and configured to compensate for a threshold voltage of the driving transistor under a control of a second scan line (SCAN2); and a display signal input unit (330), connected with the data line (DATA), a third scan line (SCAN3) and the compensation unit and configured to input a digital signal provided from the data line into the compensation unit under a control of the third scan line (SCAN3).

3. The pixel circuit of claim 1, wherein the touch detection sub-circuit further comprises:

a touch sensing unit (350), connected with the pre-charging unit and configured to sense a touch action and generate a sense signal; and a sense signal output unit (360), connected with the touch sensing unit and the third scan line (SCAN3), and configured to output the sense signal generated by the touch sensing unit to a sense signal collection line (READ LINE) under the control of the third scan line.

4. The pixel circuit of claim 3, wherein the touch detection sub-circuit further comprises:

a touch reset unit (370), connected with the touch sensing unit and the first scan line (SCAN1), configured to reset the touch sensing unit under a control of the first scan line.

5. The pixel circuit of claim 2, wherein the display driving reset unit comprises:

a display driving reset transistor (T5) having a control terminal connected with the first scan line, a first terminal connected with a first power supply line (GND) and a second terminal connected with the first node.

6. The pixel circuit of claim 2, wherein the light emitting control unit comprises:

a light emitting control transistor (T1) having a control terminal is connected with the light emitting control line, a first terminal connected with a second power supply line (Vdd), a second terminal connected with a first terminal of the driving transistor; and a second light emitting control transistor (T7) having a control terminal is connected with the light emitting control line, a first terminal connected with a second terminal of the driving transistor, and a second terminal connected with the display element.

7. The pixel circuit of claim 2, wherein the compensation unit comprises:

a compensation transistor (C1), having a first terminal connected with the first node and a second terminal thereof as an input terminal of the compensation unit for receiving the data signal;

a first compensation transistor (T2) having a control terminal connected with the second scan line, a second terminal connected with the first node and a second terminal is connected with the first terminal of the driving transistor;

a second compensation transistor (T4) having a control terminal connected with the second scan line, a second terminal connected with a second terminal of the compensation transistor, a first terminal connected with one of a first power supply line (GND), a second power supply line (Vdd) and a third power supply line (Vcom); and a third compensation transistor (T6) having a control terminal connected with the second scan line, a first terminal connected with the third power supply line (Vcom) and a second terminal connected with the second terminal of the driving transistor.

8. The pixel circuit of claim 2, wherein the display signal input unit comprises an input transistor (T3) having a control terminal connected with the third scan line, a first terminal is connected with the data line and a second terminal connected with the input terminal of the compensation unit.

9. The pixel circuit of claim 3, wherein the pre-charging unit comprises:

a pre-charging transistor (M1) having a control terminal is connected with the second scan line, a first terminal connected with the data line and a second terminal connected with a third node (c), as an output terminal of the pre-charging unit.

10. The pixel circuit of claim 9, wherein the touch sensing unit is a capacitive touch unit and comprises:

a storage capacitor (C2) having a first terminal connected with the third node (c), a second terminal connected with the third power supply line (Vcom); and a sensing transistor (M2) having a control terminal connected with the third node, a first terminal connected with the third power supply line (Vcom) and a second terminal thereof as an output terminal of the touch sensing unit.

11. The pixel circuit of claim 10, wherein the sense signal output unit comprises:

an output transistor (M3) having a control terminal connected with the third scan line, a first terminal connected with the output terminal of the touch sensing unit, and a second terminal connected with the sense signal collection line.

12. The pixel circuit of claim 4, wherein the touch sensing unit is a photosensitive touch unit and comprises:

a photosensitive transistor having a control terminal and a first terminal connected with the third node; and a storage capacitor, having a first terminal connected with a second terminal of the photosensitive transistor, and a second terminal connected with the third node.

13. The pixel circuit of claim 12, wherein the sense signal output unit comprises:
   an output transistor (M3), a control terminal connected with the third scan line, a first terminal connected with the first terminal of the storage capacitor, and the second terminal connected with the sense signal collection line.

14. The pixel circuit of claim 12, wherein the touch reset unit comprises:
   a touch reset transistor (M4) having a control terminal connected with the first scan line, a first terminal connected with the first power supply line (GND), and a second terminal connected with the third node.

15. An array substrate comprising the pixel circuit of claim 1.

16. An AMOLED display apparatus comprising the array substrate of claim 15.

17. A driving method applied to the pixel circuit of claim 1, comprising:
   driving the display element to emit light for display by the display driving sub-circuit, under the controls of the data line (DATA), the light emitting control line (EM) and the plurality of scan lines (SCAN1, SCAN2, SCAN3); and
   detecting the touch action and generate the sense signal by the touch detection sub-circuit under controls of the data line and the some of the plurality of scan lines (SCAN2, SCAN3).

18. The driving method of claim 17, wherein driving the display element to emit light for display by the display driving sub-circuit comprises:
   applying a first scan signal to the first scan line to turn on a display driving reset unit, so that a first node is reset;
   applying a second scan signal to the second scan line so as to pre-charge a compensation unit;
   applying a third scan signal to the third scan line to turn on a display signal input unit, so that a data voltage on the data line is input to the compensation unit; and
   applying a light emitting control signal to the light emitting control line to turn on the light emitting control unit, so that a voltage subjected to a threshold voltage compensation is applied to the control terminal and the second terminal of the driving transistor, and the light emitting element is driven to emit light for display.

19. The driving method of claim 17, wherein detecting the touch action and generating the sense signal by the touch detection sub-circuit comprises:
   applying a second scan signal to the second scan line to turn on the pre-charging unit, so that a capacitive touch unit is pre-charged with a data voltage signal supplied from the data line;
   sensing the touch action and generating the sense signal by the capacitive touch unit; and
   applying a third scan signal to a third scan line to turn on sense signal output unit, so that the sense signal generated by the capacitive touch unit is output to a sense signal collection line.

20. The driving method of claim 17, wherein detecting the touch action and generating the sense signal by the touch detection sub-circuit comprises:
   applying a first scan signal to a first scan line so as to reset a photosensitive touch unit;
   applying the second scan signal to the second scan line to turn on the pre-charging unit, so that the photosensitive touch unit is pre-charged with a data voltage signal supplied from the data line;
   sensing the touch action and generating the sense signal by the photosensitive touch unit; and
   applying a third scan signal to a third scan line to turn on sense signal output unit, so that the sense signal generated by the photosensitive touch unit is output to a sense signal collection line.

* * * * *